United States Patent
Nimura et al.

(10) Patent No.: US 6,947,046 B2
(45) Date of Patent: Sep. 20, 2005

(54) IMAGE GENERATION METHOD, PROGRAM, AND INFORMATION STORAGE MEDIUM

(75) Inventors: Shinobu Nimura, Yokohama (JP); Takashi Koshigoe, Yokohama (JP); Tetsuya Akatsuka, Yokohama (JP)

(73) Assignee: Namco Ltd., Tokyo (JP)

( * ) Notice: Subject to any disclaimer, the term of this patent is extended or adjusted under 35 U.S.C. 154(b) by 347 days.

(21) Appl. No.: 10/222,907

(22) Filed: Aug. 19, 2002

(65) Prior Publication Data

US 2003/0043154 A1 Mar. 6, 2003

(30) Foreign Application Priority Data

Aug. 23, 2001 (JP) ........................................ 2001-253521

(51) Int. Cl.[7] .............................................. G06T 13/00
(52) U.S. Cl. ...................... 345/473; 345/474; 345/475
(58) Field of Search ................................ 345/473, 474, 345/475

(56) References Cited

U.S. PATENT DOCUMENTS 6,057,859 A * 5/2000 Handelman et al. ........ 345/474
6,522,331 B1 * 2/2003 Danks ........................ 345/473

* cited by examiner

Primary Examiner—Almis R. Jankus
(74) Attorney, Agent, or Firm—Oliff & Berridge, PLC

(57) ABSTRACT

Motion data of a model object is blended based on individual blend ratios βA and βB that are set for each bone of a skeleton. The individual blend ratios βB for bones at end portions of the skeleton (weapons, hands, and feet) are high whereas those for main structural components (pelvis and chest) are low. A general blend ratio α that is set uniformly for all the bones of the skeleton is also used. A plurality of motion control sections are made to operate simultaneously in parallel to select the motion data, based on motion scripts in which motion data to be selected and motion script switching conditions are defined, and the selected motion data is blended. A group of transitional motion scripts and a group of attack motion scripts are allocated to the first and second motion control sections, and transitional motions and attack motions are blended.

28 Claims, 21 Drawing Sheets

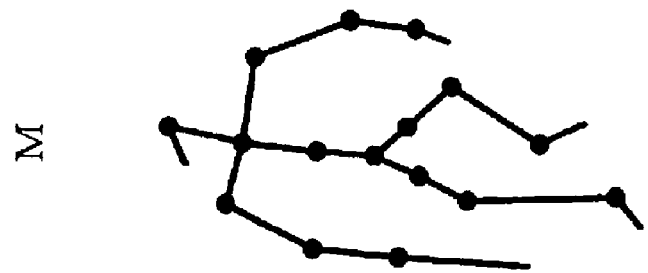
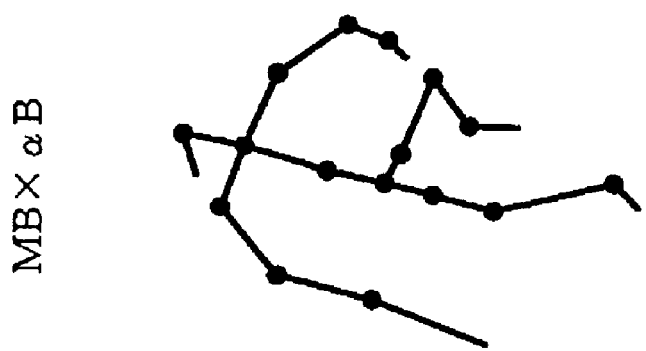
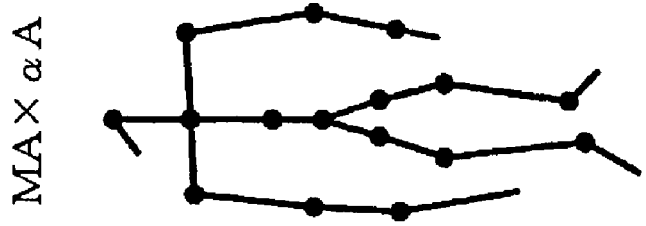
FIG. 3

HIT (CONTACT) EVENT

INCURSION EVENT

THROWING EVENT

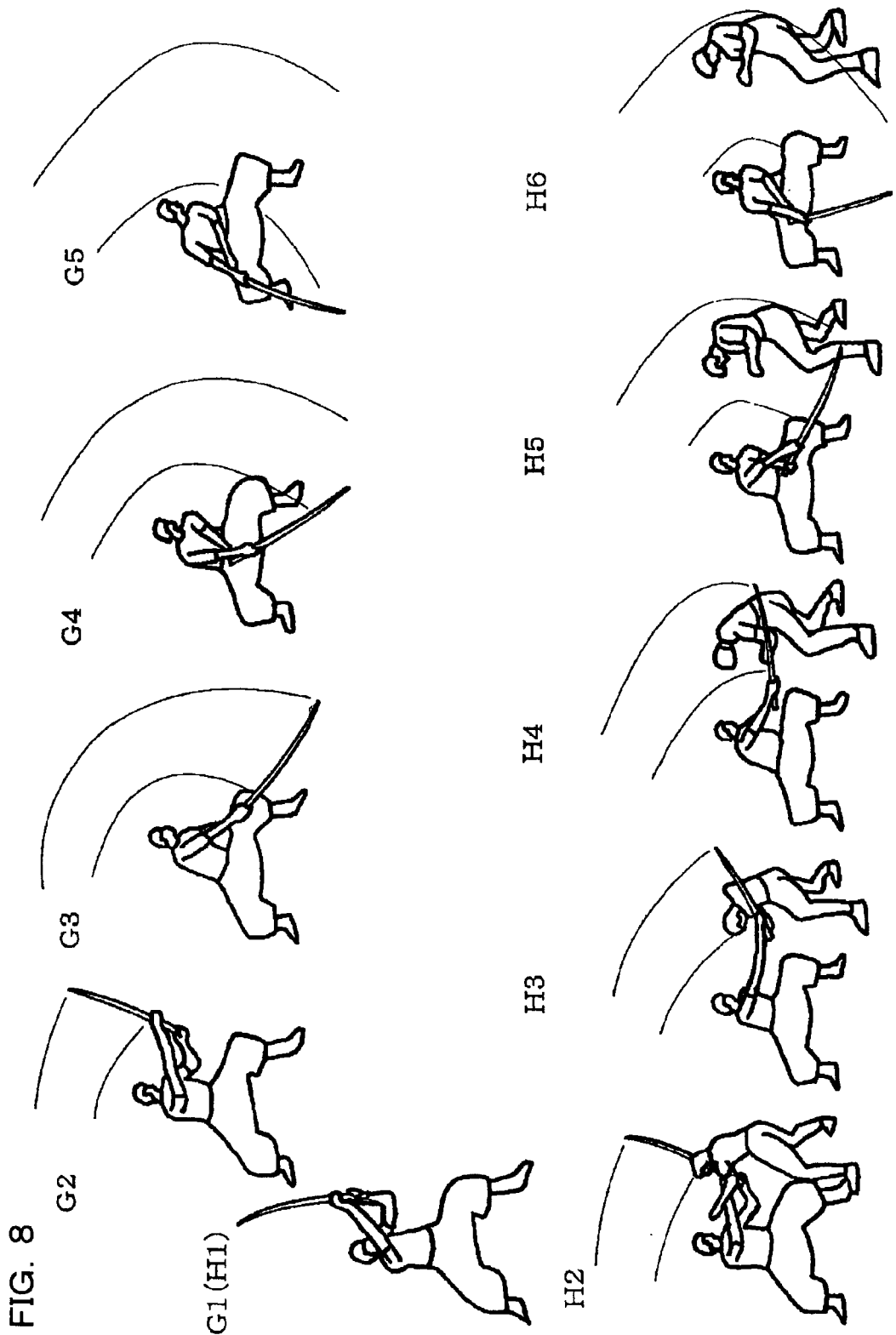

FIG. 12
GROUP OF TRANSITION (MOVEMENT) MOTION SCRIPTS
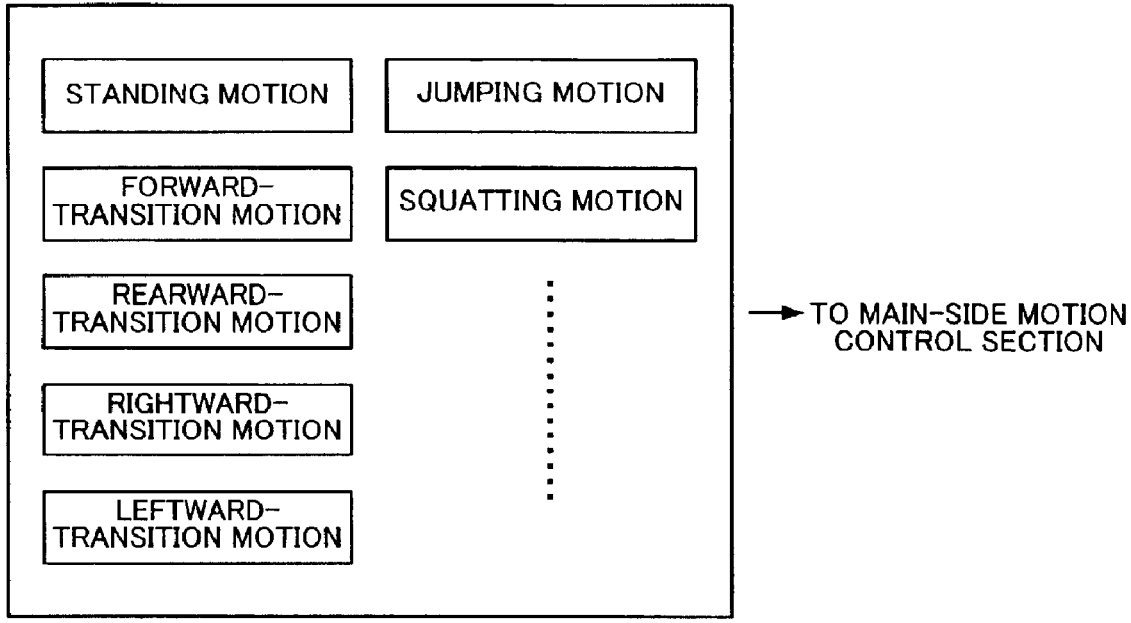
→ TO MAIN-SIDE MOTION CONTROL SECTION
GROUP OF ATTACK MOTION SCRIPTS
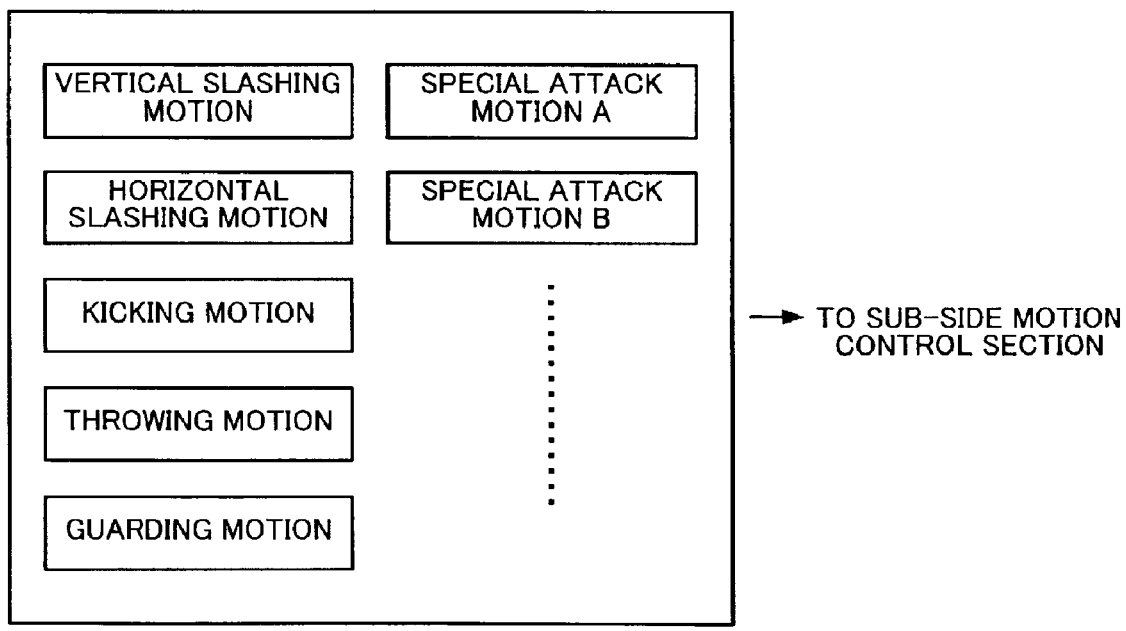
→ TO SUB-SIDE MOTION CONTROL SECTION

IMAGE GENERATION METHOD, PROGRAM, AND INFORMATION STORAGE MEDIUM

Japanese Patent Application No. 2001-253521, filed on Aug. 23, 2001, is hereby incorporated by reference in its entirety.

BACKGROUND OF THE INVENTION

The present invention relates to an image generation method, a program, and an information storage medium.

An image generation device (game system) that is known in the art generates an image as seen from a virtual camera (a given viewpoint) in an object space in which there is a virtual three-dimensional image, making it highly popular for enabling players to experience a virtual reality. Taking an image generation system that enables players to enjoy a fighting game, as an example, each player uses a game controller (manipulation section) to manipulate his or her own character, to enjoy a game of combat against an enemy character manipulated by another player or a computer.

With such a fighting game, it is preferable that diverse motions of the character are represented in a realistic manner. It is preferable that not only should the motion of an attack when the character is standing still be represented, but it should also be possible to implement motions that represent an attack while running and an attack while jumping. When the character's sword hits an enemy character, it is preferable that the fact that the sword has hit is conveyed to the player in an effective manner, to enable the implementation of "contact response".

If the representation of such realistic diverse motions is implemented, however, a technical problem arises in that the processing load for motion control becomes extreme.

BRIEF SUMMARY OF THE INVENTION

According to a first aspect of the present invention, there is provided an image generation method for generating an image, comprising:

blending motion data that specifies the shape of a skeleton of a model object, based on an individual blend ratios of which values are set individually for each bone that configures the skeleton of the model object;

performing motion processing of the model object, based on the motion data obtained by the blending; and generating an image from a given viewpoint within an object space in which a plurality of objects including the model object are disposed.

According to a second aspect of the present invention, there is provided an image generation method for generating an image, comprising:

selecting motion data for a model object and controlling motion of the model object by a plurality of motion control sections, based on motion scripts in which are defined the motion data to be selected and motion script switching conditions;

blending the motion data selected by the motion control sections;

performing motion processing of the model object, based on the motion data obtained by the blending; and generating an image from a given viewpoint within an object space in which a plurality of objects including the model object are disposed.

BRIEF DESCRIPTION OF THE SEVERAL VIEWS OF THE DRAWING

FIG. 3 is illustrative of motion blending.

FIG. 8 shows an example of a vertical slashing motion when a hit event does not occur and an example of a vertical slashing motion when a hit event does occur.

FIG. 12 is illustrative of a group of transitional motion scripts and a group of attack motion scripts.

DETAILED DESCRIPTION OF THE EMBODIMENT

Figure 1:
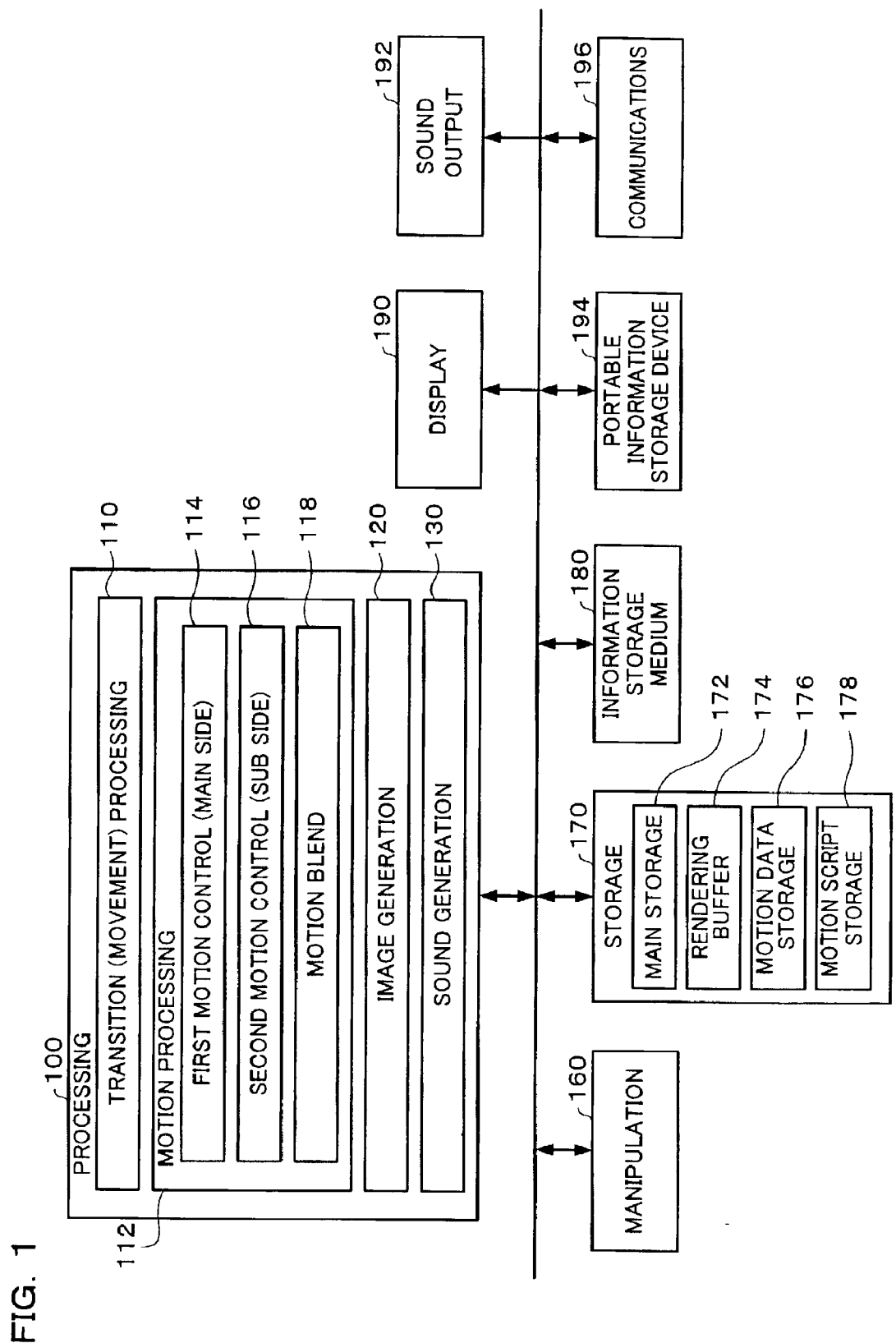
FIG. 1 is a functional block diagram showing an example of an image generation system in accordance with one embodiment of the present invention.

Embodiments of the present invention is described below.

Note that the embodiments described below do not in any way limit the scope of the present invention defined by the claims laid out herein. In addition, all the elements of the embodiments described below should not be taken as essential requirements of the present invention.

An image generation method for generating an image according to one embodiment of the invention comprises:

blending motion data that specifies the shape of a skeleton of a model object, based on an individual blend ratios of which values are set individually for each bone that configures the skeleton of the model object;

performing motion processing of the model object, based on the motion data obtained by the blend; and generating an image from a given viewpoint within an object space in which a plurality of objects including the model object are disposed.

This embodiment enables motion blending based on the individual blend ratios that can be set individually for each bone making up the skeleton. This ensures that if first and second sets of motion data are blended, by way of example, the individual blend ratio of second motion data can be set high for an Mth bone of the skeleton whereas the individual blend ratio of second motion data can be set low for an Nth bone thereof. This makes it possible to implement motion blending with blend ratios that are different for different parts of the model object, thus enabling the implementation of a wide range of representations with a small amount of motion data.

With this embodiment, when the skeleton of the model object includes a Kth bone positioned at an end portion of the skeleton, a (K+1)th bone adjacent to the Kth bone, a (K+2)th bone adjacent to the (K+1) th bone, . . . and an Lth bone; the individual blend ratios for first motion data in the motion data may be set to gradually increase and individual blend ratios for second motion data in the motion data may be set to gradually decrease, from the Kth bone towards the Lth bone.

This makes it possible to ensure that the effect of the second motion data on the Kth bone at the end portion is greater than that of the first motion data, and the effect of the first motion data on an Lth bone (such as a bone positioned in a central section that is not an end portion) is greater than that of the second motion data.

With this embodiment, the motion data may be blended on the basis of a general blend ratio of which value is set uniformly for bones of the skeleton of the model object, and the individual blend ratios of which values are set individually for each bone.

This makes it possible to strengthen or weaken the effects on the motion blend of individual blend ratios by changing the general blend ratio, thus enabling the implementation of a wide variety of motion representations.

With this embodiment, the general blend ratio may be changed with the elapse of time.

In such a case, the elapse of time could be determined by frame progress (by a counter that is incremented at each frame update), or it could be based on real time (by a timer) or virtual game time.

An image generation method for generating an image according to one embodiment of the invention comprises:

selecting motion data for a model object and controlling motion of the model object by a plurality of motion control sections, based on motion scripts in which are defined the motion data to be selected and motion script switching conditions;

blending the motion data selected by the motion control sections;

performing motion processing of the model object, based on the motion data obtained by the blending; and generating an image from a given viewpoint within an object space in which a plurality of objects including the model object are disposed.

This embodiment makes it possible for the plurality of motion control sections to operate in parallel, enabling a motion blend of a plurality of sets of motion data selected by this plurality of motion control sections. It is therefore possible to implement motion control by kind of a motion script obtained by combining first motion scripts of the first motion control section and second motion scripts of the second motion control section, by way of example. This enables the implementation of the representation of a wide range of motion scripts with a small amount of data.

Note that the motion data selected by each of the first and second motion control sections could be obtained by blending a plurality of sets of motion data.

With this embodiment, whether the motion script switching condition is satisfied or not may be determined, based on input data from a manipulation section and status information for the model object.

The status information for the model object may be information relating to motions performed by the model object or status parameters for the model object (such as physical strength, attacking force, or defending force).

With this embodiment, a first group of the motion scripts may be allocated to a first motion control section of the plurality of motion control sections; and a second group of the motion scripts may be allocated to a second motion control section of the motion control sections.

This would make it possible to blend and play (reproduce) motion data selected by a motion script of the first group of motion scripts and motion data selected by a motion script of the second group of motion scripts.

With this embodiment, the motion script switching conditions for switching to the motion scripts of the second group may be defined in the motion scripts of the first group; and the first motion control section may continue to perform motion control based on the motion scripts of the first group, even when the motion script switching conditions for switching to the motion scripts of the second group are satisfied and the second motion control section has started motion control based on the motion scripts at the switching destination.

This would make it possible for the first motion control section to operate in parallel with the second motion control section, even after the second motion control section has started operating. This therefore makes it possible to represent motions such that a first motion is played (replayed) by the first motion section, then a blend of first and second motions is played by the first and second motion control sections, and finally the motion play returns to the first motion of the first motion control section, byway of example.

With this embodiment, a group of transitional motion scripts among the motion scripts having a switching condition which requires a transition instruction from a manipulation section for switching may be allocated to a first motion control section of the plurality of motion control sections;

a group of attack motion scripts among the motion scripts having a switching condition which requires an attack instruction from the manipulation section for switching may be allocated to a second motion control section of the motion control sections;

the first motion control section may select transitional motion data corresponding to the transitional motion scripts;

the second motion control section may select attack motion data corresponding to the attack motion scripts; and the transitional motion data selected by the first motion control section may be blended with the attack motion data selected by the second motion control section.

This would make it possible to blend a transitional motion controlled by the first motion control section with an attack motion controlled by the second motion control section, enabling the implementation of a representation of the model object attacking while moving, with a small amount of data.

One embodiment of the present invention will be described below with reference to the accompanying figures.

1. Configuration

A typical block diagram of an image generation system (game system in accordance with the embodiment is shown in FIG. 1. Note that the embodiment shown in this figure comprises at least a processing section 100 (or the processing section 100 and a storage section 170), but other blocks thereof can be implemented by any other structural components.

A manipulation section 160 is designed to enable the player to input operating data, where the functions thereof can be implemented by hardware such as a joystick, buttons, a microphone, a sensor, or a casing.

The storage section 170 acts as a work area for components such as the processing section 100 and a communications section 196, where the functions thereof can be implemented by hardware such as RAM.

An information storage medium 180 (a storage medium that can be used by a computer) is designed to store information such as programs and data, and its functions could be implemented by hardware such as an optical disk (CD or DVD), a magneto-optical (MO) disk, a magnetic disk, a hard disk, magnetic tape, or ROM. The processing section 100 performs the various types of processing in accordance with the present invention (this embodiment), based on the information stored in this information storage medium 180. In other words, within the information storage medium 180 is stored (recorded) information (a program for causing the implementation of processing on a computer) for causing the computer to function as the various parts (particularly the blocks comprised within the processing section 100) of the present invention (this embodiment).

Note that all or part of the information stored in the information storage medium 180 can be transferred to the storage section 170 at a suitable time, such as at power-on. The information stored in the information storage medium 180 comprises data such as a program for executing the processing of the present invention, image data, sound data, and shape data for display objects.

A display section 190 is designed to output images created by this embodiment of the present invention, and the functions thereof can be implemented by hardware such as a CRT, LCD panel, or head-mounted display (HMD).

A sound output section 192 is designed to output sounds created by this embodiment of the present invention, and the functions thereof can be implemented by hardware such as a speaker.

A portable information storage device 194 stores data such as a player's personal data and saved data, and various devices such as a memory card or a portable game machine could be conceived as this portable information storage device 194.

A communications section 196 provides various types of control for communicating with an external device (such as a host device or another image generation system), and the functions thereof can be implemented by hardware such as various types of processor, or a communications ASIC, or a program.

Note that a program or data for causing the computer to function as the various parts of the present invention (this embodiment) could be distributed to the information storage medium 180 from an information storage medium possessed by a host device (server), through a network and the communications section 196. Such use of an information storage medium on the host device (server) is comprised within the scope of the present invention.

The processing section 100 (processor) performs various types of processing, such as game processing, image generation processing, or sound generation processing, based on manipulation data from the manipulation section 160 and a program. In such a case, the processing section 100 uses a main storage section 172 within the storage section 170 as a work area for the processing.

In this case, the processing performed by the processing section 100 could be: processing for accepting a coin (or equivalent), processing for setting various modes, processing for moving the game forward, processing for setting a selection screen, processing for obtaining the position and rotational angle (rotational angle about the X-, Y-, or Z-axis) of an object (one or more primitives), processing for making an object operate (motion processing), processing for obtaining a viewpoint position (position of a virtual camera) and line-of-sight angle (rotational direction of the virtual camera), processing for disposing an object such as a map object in an object space, hit check processing, processing for calculating the game results (effects or score), processing to enable a plurality of players to play in a common game space, or game-over processing.

The processing section 100 comprises a transition (movement) processing section 110, a motion processing section 112, an image generation section 120, and a sound generation section 130. Note that processing section 100 need not necessarily comprise all of these function blocks.

In this case, the transition processing section 110 performs processing to control the transitional actions of a model object (such as a character, robot, vehicle, or tank).

More specifically, the transition processing section 110 performs processing to cause movements (forward motion and rotational motion) of a model object in an object space (game space). This transition processing for the model object makes it possible to obtain the position and rotational angle of the model object in the current frame (interval), based on factors such as manipulation data from the manipulation section 160 (input data from the player) and the position and rotation angle (direction) of the model object in the previous frame (such as 1/60 or 1/30 of a second before). Assume that the position and rotational angle of the model angle in the (k−1)th frame are $P_{k-1}$ and $\Theta_{k-1}$, the amount of change in the position (speed) of the model object in one frame is $\Delta P$, and the amount of change in the angle thereof (rotational speed) is $\Delta \theta$, by way of example. In such a case, the position $P_k$ and rotational angle $\theta_k$ of the model object in the kth frame are as given by Equations (1) and (2) below:

$$P_k = P_{k-1} + \Delta P \qquad (1)$$

$$\theta_k = \theta_{k-1} + \Delta \theta \qquad (2)$$

The motion processing section 112 performs processing (motion play or motion generation) to move (animate) the model object (character). This motion processing for the model object makes it possible to implement the play (replay) of motion of the model object, based on motion data stored in a motion data storage section 176.

More specifically, within the motion data storage section 176 is stored motion data comprising the positions or rotational angles (rotational angles about three axes of each child bone with respect to the corresponding parent bone) of each bone that makes up the skeleton of the model object. The motion processing section 112 reads out this motion data and plays the motion of the model object by making the various bones (part objects) that configure the skeleton of the model object move (causing the skeleton shape to change), based on this motion data.

Note that it is preferable that the motion data stored in the motion data storage section 176 is data created by attaching sensors to a real person and capturing the motion thereof, but the motion data could also be generated in real time from a simulation made by using physical simulations (simulations using physical computations, but pseudo-physical computations could also be used) and motion blending.

To enable the realistic motion play with a small amount of motion data, inverse kinematics could be used for the motion play.

In this embodiment, the motion processing section 112 comprises a first motion control section 114 (a main-side motion control section), a second motion control section 116 (a sub-side motion control section), and a motion blend section 118. Note that the configuration could be such that three or more motion control sections are provided.

In this case, the first and second motion control sections 114 and 116 select motion data for a model object, based on a motion script (a script that defines a processing sequence for motion control) stored in a motion script storage section 178.

Within each motion script is defined at least motion data that ought to be currently selected by the motion control section to which this motion script is allocated, and a switching condition for that motion script (a switching condition for the motion script allocated to the motion control section, or a switching condition determined from manipulation input, status information for the model object, or the game situation).

If the motion script that has been allocated to the first motion control section 114 is forward transition (transition in the forward direction) motion script, by way of example, the first motion control section 114 selects forward-transitional motion data for the motion play. If a switching condition (setting condition) such that "transfer to a vertical slashing motion script if a vertical slash attack instruction is input by the manipulation section 160 while the model object is moving forward" is defined within the forward-transitional motion script and that switching condition is satisfied, the motion script allocated to the second motion control section 116 changes (is set to) a vertical slashing motion script. Note that the allocation of the forward-transitional motion script remains at the first motion control section 114. The second motion control section 116 that has been allocated this vertical slashing motion script uses the vertical slashing motion data in motion play.

Note that the first motion control section 114 could change the motion script allocated to the first motion control section 114 in accordance with a switching condition defined in the motion script, or it could change the motion script allocated to the second motion control section 116. Alternatively, the second motion control section 116 could change the motion script allocated to the first motion control section 114 in accordance with a switching condition defined in the motion script, or it could change the motion script allocated to the second motion control section 116.

It is preferable that the first motion control section 114 selects the motion script to be used from a first group of motion scripts (such as a group of motion scripts relating to transitional actions) and the second motion control section 116 selects the motion script to be used from a second group of motion scripts (such as a group of motion scripts relating to attacks). This simplifies the management of the motion script.

The motion blend section 118 performs processing to blend the motion data (motion blend processing).

More specifically, motion data (motion data for each frame) that specifies the skeleton shape of the model object (the way in which the skeleton shape changes) is blended (combined) on the basis of individual blend ratios (individual combination ratios) of which values are set individually for each bone (arc, joint, or part object) that makes up the skeleton of the model object. The blending of the motion data is also based on a general blend ratio of which value is set uniformly for all the bones of the skeleton of the model object. In this case, it is preferable that the blending of the motion data is based on a blend ratio obtained by multiplying each individual blend ratio by the general blend ratio, by way of example.

The blend data that is the objective of the blending done by the motion blend section 118 is selected by the first and second motion control sections 114 and 116. In this case, the first and second motion control sections 114 and 116 could select the motion data created by the blend processing of the motion blend section 118, and the thus-selected motion data could then be blended again by the motion blend section 118.

The motion blend section 118 performs processing by setting and changing a general blend ratio and individual blend ratios. In such a case, it is preferable that the general blend ratio is varied in accordance with the elapse of time (such as frame progression, the elapse of virtual game time, or the elapse of real time).

The motion blend section 118 starts the blend processing based on both the general blend ratio and the individual blend ratios when a given event has occurred. The blend processing ends when a given time has elapsed (at the time of a hit or a motion return), and the processing returns to the play of the original basic motion (first motion).

In this case, an event is a phenomenon that occurs in the game space (object space), where events that can be considered include: a hit event (slash event) between a model object (a part of a model object such as a weapon, hand, or foot) and another object (such as an enemy character), a contact event between the model object and another object, an incursion event in which the model object invades a given area (an area in which movement of a part of the model object is restricted), or an event in which the model object throws something (such as a ball or spear).

If one of these events occurs with this embodiment, the individual blend ratio of the bone that is most affected by that event (the bone with the closest relationship to that event) is set to a blend ratio which blends less of first motion data (motion data that is blended into the motion data before the event occurs) than second motion data (motion data blended into the first motion data after the event has occurred) This makes it possible to ensure that, if an event occurs, the bone that ought to be affected by that event moves in a manner that is strongly dependent on the second motion data.

Note that the motion data that is subjected to blending by the motion blend section 118 could be motion data with mutually completely different contents (motion data in which the movement of the skeleton shape is mutually completely different), or it could be motion data with the same data contents (motion data for the same movement of the skeleton shape). More specifically, the configuration is such that the first motion data is blended with the second motion data that has a play speed and a play frame number (play start frame) that differ from those of the first motion data (although the data contents are the same as those of the first motion data). This makes it possible to give the impression of slow-motion play and fast-forwarding. If these first and second sets of motion data are blended on condition that a given event has occurred, it is possible to create images in which the motion of the model object is slowed or fast-forwarded after the event has occurred.

The image generation section 120 performs image processing based on the results of the various processes performed by the processing section 100, to generate a game image and output it to the display section 190. During the generation of three-dimensional game images, for example, the image generation section 120 first performs various geometrical processes such as coordinate transformation, clipping, perspective transformation, or light-source computation, then it creates rendering data (such as position coordinates, texture coordinates, color (luminance) data, normal vectors, or α values for vertices (structural points) of primitive surfaces), based on the results of the above processing. An image of an object (formed of one or more primitive surfaces) after the geometrical processing is then rendered into a rendering buffer 174 (a buffer which can hold image information in pixel units, such as a frame buffer or work buffer, based on this rendering data (primitive surface data). This ensures the creation of an image as seen by a virtual camera (given viewpoint) within an object space.

The sound generation section 130 performs sound processing based on the various processing results obtained by the processing section 100, to generate games sounds such as background music, sound effects, and voices, and outputs them to the sound output section 192.

Note that the image generation system of this embodiment could be applied to a system with a dedicated single-player mode, which enables one player to play the game, or it could also be applied to a system provided with a multi-player mode, which enables a plurality of players to play.

If a plurality of players are playing, the game images and game sounds supplied to this plurality of players could be created by using one terminal, or they could be created by using a plurality of terminals (game machines or mobile phones) connected by a network (transmission lines or communications circuitry) or the like.

2. The Method of This Embodiment

The method of this embodiment will now be described with reference to the accompanying drawings. Note that this embodiment is mainly described below in connection with a fighting game, but this embodiment can also be applied to a wide range of games other than fighting games.

2.1 Motion Blending

Figure 2:
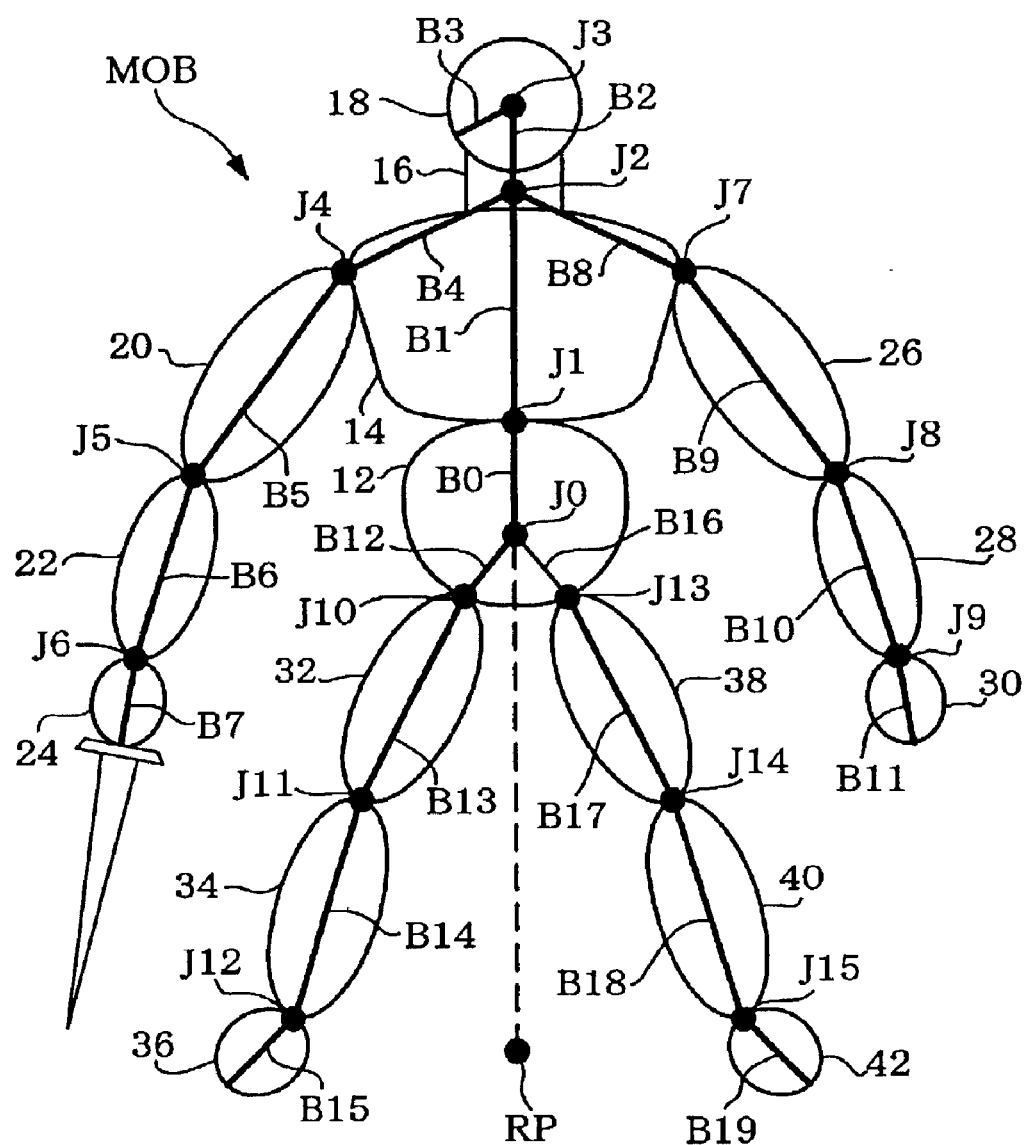
FIG. 2 shows an example of a model object and a skeleton configuration.

With this embodiment, a model object MOB (character) is configured of a plurality of part objects (a pelvis 12, a chest 14, a neck 16, a head 18, an upper right arm 20, a lower right arm 22, a right hand 24, an upper left arm 26, a lower left arm 28, a left hand 30, a right thigh 32, a right shin 34, a right foot 36, a left thigh 38, a left shin 40, and a left foot 42), as shown in FIG. 2. The positions and rotational angles of these part objects (components) are specified by the positions of bones B0 to B19 that configure a skeleton model (the positions of joints J0 to J15) and rotational angles (the relative rotational angles of each child bone with respect to the corresponding parent bone). Note that these bones and joints are virtual objects; they are not objects that represent reality.

With this embodiment, the bones (motion bones, joints, and part objects) that configure the skeleton of the model object MOB have a parent/child (hierarchical) structure. For example, the parents of the bones B7 and B11 of the hands 24 and 30 are the bones B6 and B10 of the lower arms 22 and 28, respectively, and the parents of B6 and B10 are the bones B5 and B9 of the upper arms 20 and 26, respectively. Similarly, the parent of B4 and B9 is the bone B1 of the chest 14 and the parent of B1 is the bone B0 of the pelvis 12. Furthermore, the parents of the bones B15 and B19 of the feet 36 and 42 are the bones B14 and B18 of the shins 34 and 40, respectively, the parents of B14 and B18 are the bones B13 and B17 of the thighs 32 and 38, respectively, and the parents of B13 and B17 are the bones B12 and B16 of the pelvis 12, respectively.

The positions and rotational angles of these bones (part objects and joints) are stored as motion data in the motion data storage section. Note that the configuration could be such that only the rotational angles of each bone are comprised within the motion data and the position of each bone (the position of each joint) is comprised in the model data of the model object.

Assume that a walking motion is made up of reference motions M0, M1, M2, . . . to MN (motions in each frame). In such a case, the position or rotational angle of each bone at reference motion M0, M1, M2 . . . to MN is stored as motion data beforehand. Motion play is implemented by sequentially reading out the motion data for the reference motions as time elapses, first by reading out the positions and rotational angles for each part object for reference motion M0, then by reading out the positions and rotational angles for each part object for reference motion M1.

Note that the motion data stored in the motion data storage section is generally obtained by motion capture, or is created by a designer. The position and rotational angles of each bone are expressed as relative positions and relative rotational angles (rotational angles about three axes) with respect to the corresponding parent bone.

In FIG. 2, RP denotes a reference point for the model object MOB, where this RP is set to be a position directly under (at zero height) the pelvis (J0), by way of example.

In FIG. 2, the hand 24 and a weapon (sword) are formed to be integrated as the same part object, but the hand 24 and the weapon could equally well be separate part objects. In other words, a bone for the hand 24 and a bone for the weapon would be separate bones.

With this embodiment of the present invention, motion data that specifies the skeleton of the model object shape (the way in which the skeleton deforms as time elapses) is subjected to blend processing as shown in FIG. 3.

If motion data MA (generally speaking: first motion data; hereinafter the same) and motion data MB (generally speaking: second motion data; hereinafter the same) are blended by a blend ratio αA for MA and a blend ratio αB for MB, by way of example, processing in accordance with the equations below produces post-blend motion data M for the data for each bone of the skeleton:

$$M = MA \times \alpha A + MB \times \alpha B$$

$$M = MA \times (1 - \alpha B) + MB \times \alpha B \quad (3)$$

Note that it is not necessary to set both of the blend ratios αA and αB; αA could be obtained by the computation αA=1−αB, by way of example.

More specifically, the motion blends of Equation (3) could be done with respect to a local bone matrix (a matrix for transforming coordinates into the local coordinate system). In other words, a local matrix for each bone (motion bone) is computed, based on the rotational angles and position of each bone comprised within the motion data and model data. The local bone matrix obtained for the motion data MA and the local bone matrix obtained for the motion data MB are blended by computation of Equation (3), to obtain a local bone matrix for the post-blend motion data M.

If the motion data MA and MB and the local bone matrix for the post-blend motion data M are expressed as MTA, MTB, and MT, the following equation is applied:

$$MT = MTA \times \alpha A + MTB \times \alpha B \qquad (4)$$
$$= MTA \times (1 - \alpha B) + MTB \times \alpha B$$

The parent/child relationships of the bones are then determined from the parent/child configuration data comprised within the model data, then a world bone matrix for the motion data M is obtained by sequentially multiplying the local child bone matrices against the local parent bone matrix (the local matrix MT of the post-blend motion data M). World coordinates of the vertices of each part object (polygon) belonging to the bones are then obtained, based on the thus-obtained world bone matrix for the motion data M. This makes it possible to shape the model object (skeleton shape) in accordance with the post-blend motion data M.

Note that instead of multiplying the local matrices as described above, it is also possible to multiply a world matrix (generally speaking: a coordinate transformation matrix; hereinafter the same).

2.2 Motion Blending Based on Individual Blend Ratios

Up until now, motion blends have been based on general blend ratios (overall combination ratios). In this case, a general blend ratio is a blend ratio that is set uniformly for all the bones of the skeleton of the model object (a blend ratio that is used uniformly).

Assume that the general blend ratio for the motion data MA is $\alpha A$ and the general blend ratio for the motion data MB is $\alpha B$ (where $\alpha A = 1 - \alpha B$), by way of example. If $\alpha A = 0.2$ and $\alpha B = 0.8$, for example, the data for all of the bones of the motion data MA is multiplied by $\alpha A = 0.2$ and the data for all of the bones of the motion data MB is multiplied by $\alpha B = 0.8$. More specifically, the coordinate transformation matrix (local matrix or world matrix) of all the bones of the motion data MA is multiplied by $\alpha A = 0.2$ and the coordinate transformation matrix (local matrix or world matrix) of all the bones of the motion data MB is multiplied by $\alpha B = 0.8$.

With such a general blend ratio alone, however, it has been determined that it is not possible to increase the diversity of the motion data obtained by motion blending.

Figure 4:
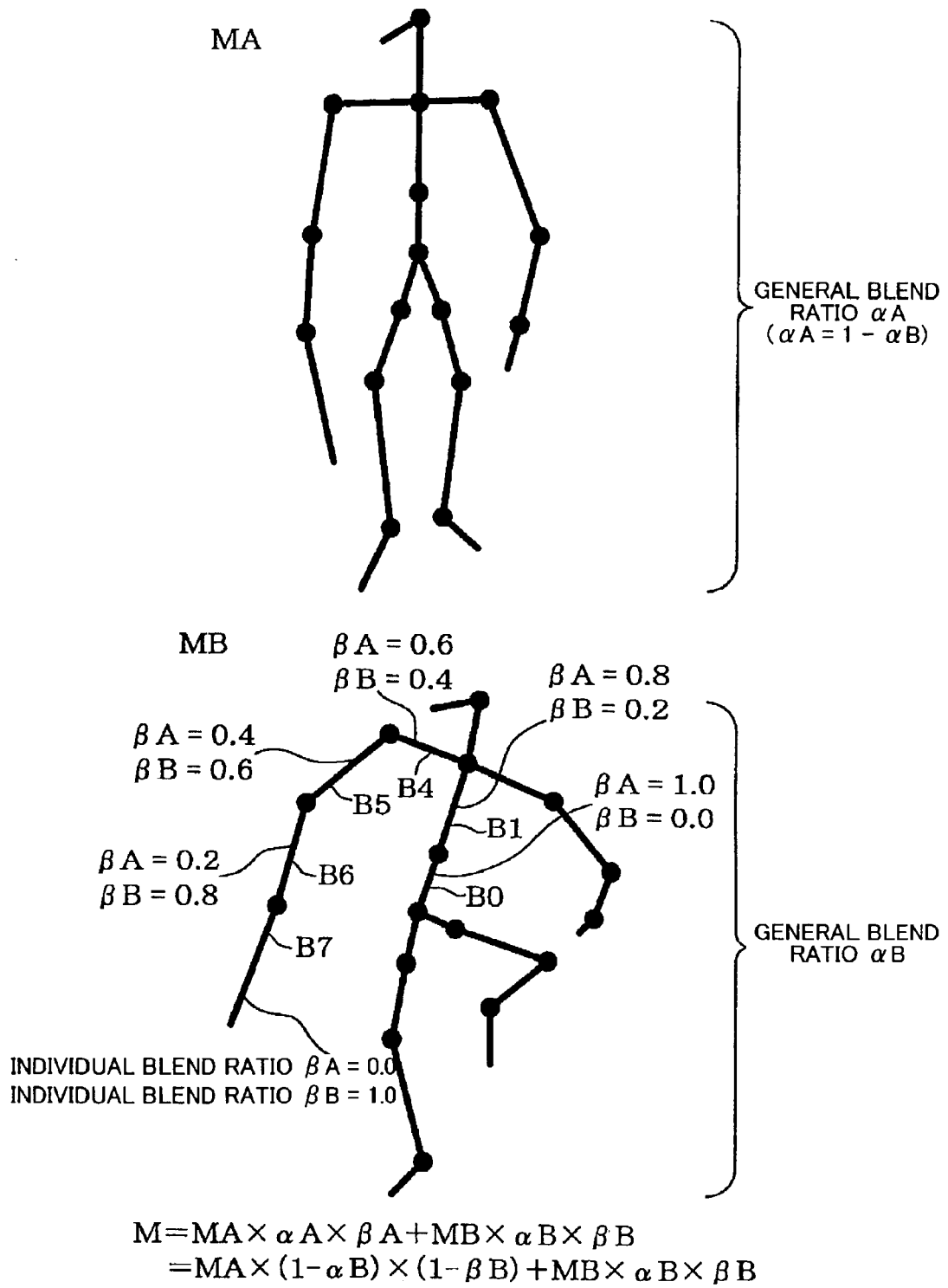
FIG. 4 is illustrative of the setting of individual blend ratios.

This embodiment introduces the concept of individual blend ratios (individual combination ratios) that differ from a general blend ratio, as shown in FIG. 4. In this case, an individual blend ratio is a blend ration that can be set freely for each bone (arc, joint, or part object) that configures the skeleton of the model object. More specifically, it is a blend ratio that can multiply the coordinate transformation matrices for the bones by different values for each bone.

The individual blend ratio for the motion data MA is expressed as $\beta A$ and the individual blend ratio for the motion data MB is expressed as $\beta B$ (where $\beta A = 1 - \beta B$), by way of example. In that case, the individual blend ratios for the bone B7 (hand and weapon) in FIG. 4 are set to be $\beta A = 0.0$ and $\beta B = 1.0$, those for the bone B6 (lower arm) are set to be $\beta A = 0.2$ and $\beta B = 0.8$, those for the bone B5 (upper arm) are set to be $\beta A = 0.4$ and $\beta B = 0.6$, those for the bone B4 (shoulder) are set to be $\beta A = 0.6$ and $\beta B = 0.4$, those for the bone B1 (chest) are set to be $\beta A = 0.8$ and $\beta B = 0.2$, and those for the bone B0 (pelvis) are set to be $\beta A = 1.0$ and $\beta B = 0.0$.

The post-blend motion data M can be obtained by applying the processing of the following equation to the thus-set blend ratios, by way of example:

$$M = MA \times \alpha A \times \beta A + MB \times \alpha B \times \beta B \qquad (5)$$
$$= MA \times (1 - \alpha B) \times (1 - \beta B) + MB \times \alpha B \times \beta B$$

More specifically, if the motion data MA and MB and the bone coordinate transformation matrix (local matrix or world matrix) of the post-blend motion data M are expressed by MTA, MTB, and MT, the following equation applies:

$$MT = MTA \times \alpha A \times \beta A + MTB \times \alpha B \times \beta B \qquad (6)$$
$$= MTA \times (1 - \alpha B) \times (1 - \beta B) + MTB \times \alpha B \times \beta B$$

In Equation (6), the general blend ratios $\alpha A$ and $\alpha B$ have the same value for the coordinate transformation matrices of all the bones, but the individual blend ratios $\beta A$ and $\beta B$ are set to different values for each bone coordinate transformation matrix.

Note that one of the general blend ratios $\alpha A$ and $\alpha B$ could be set alone as data, with the other one being obtained by computations. For example, $\alpha B$ could be set to be data and $\alpha A$ could be obtained by computing $\alpha A = 1 - \alpha B$, or vice versa.

Similarly, one of the individual blend ratios $\beta A$ and $\beta B$ could be set alone as data, with the other one being obtained by computations. For example, $\beta B$ could be set to be data and $\beta A$ could be obtained by computing $\beta A = 1 - \beta B$, or vice versa.

2.3 Blending Attack Motion and Transitional Motion

This embodiment succeeds in implementing a wide range of motion representations with a small amount of motion data, by introducing individual blend ratios as described above.

As shown by example in FIG. 4, the individual blend ratio $\beta A$ for the motion data MA increases gradually from a low blend ratio ($\beta A = 0.0$) to a high blend ratio ($\beta A = 1.0$), in succession from the bone B7 (the Kth bone) positioned at the end portion (far end portion) of the skeleton of the model object, to the bone B6 (a (K+1)th bone) adjacent thereto, to the bone B5 (a (K+2) th bone) adjacent thereto, . . . and the bone B0 (an Lth bone) of the central section (main structural component). The individual blend ratio $\beta B$ for the motion data MB, on the other hand, decreases gradually from a high blend ratio ($\beta B = 1.0$) to a low blend ratio ($\beta B = 0.0$).

By setting individual blend ratios in this manner, it is possible to blend transitional motion with an attack motion using a weapon (the bone B7) or the like, making it possible to create a realistic motion image that does not seem unnatural to the player.

Figure 5:
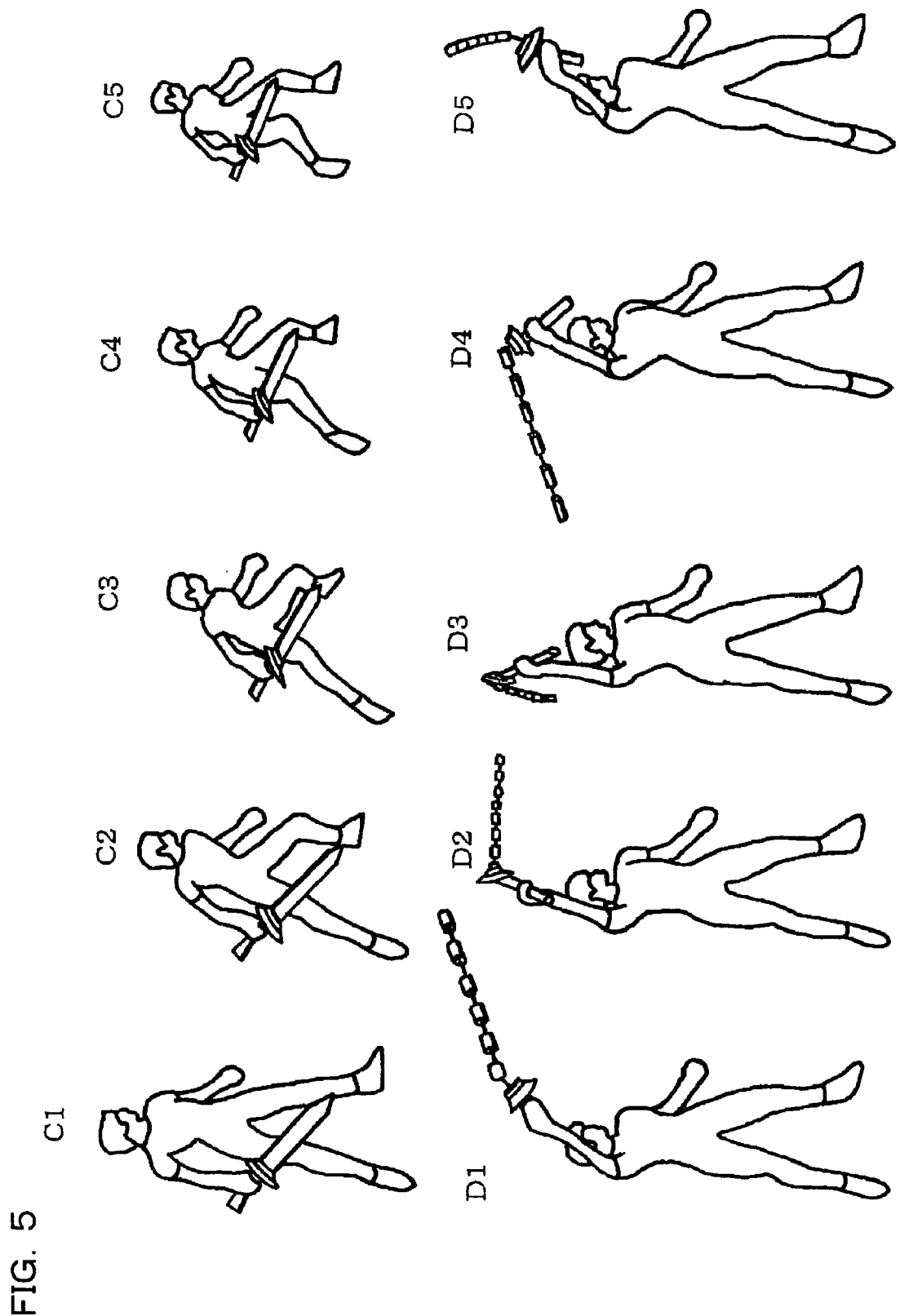
FIG. 5 shows an example of a transitional motion and an attack motion.

A series of transitional motions of the model object (the motion data MA) is shown at C1 to C5 in FIG. 5. Similarly, a series of attack motions of the model object (the motion data MB) is shown at D1 to D5 of FIG. 5. A series of transition/attack motion (motion data M) that is created by blending the transitional motions C1 to C5 and the attack motions D1 to D5 in accordance with the method of this embodiment is shown at E1 to E5 of FIG. 6.

Figure 6:
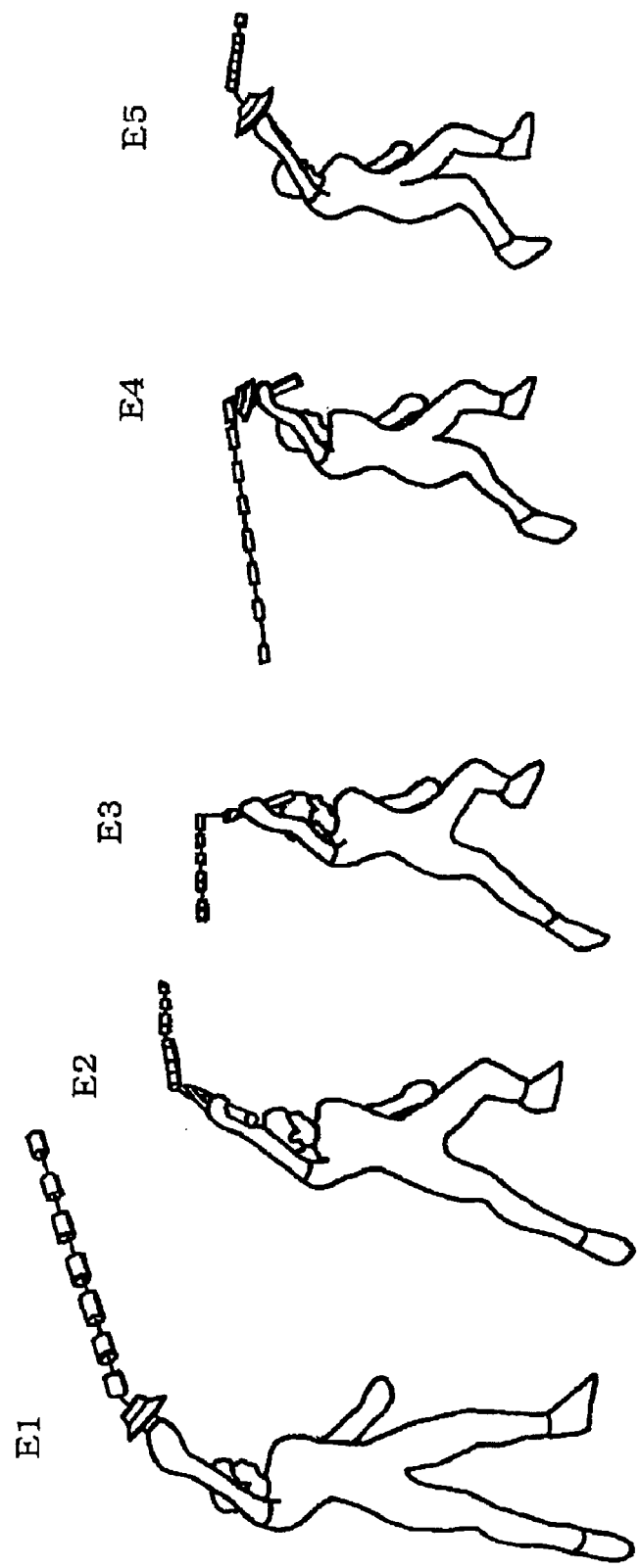
FIG. 6 shows an example of a motion obtained by blending a transitional motion and an attack motion.

As is clear from a comparison of E1 to E5 of FIG. 6 and C1 to C5 and D1 to D5 of FIG. 5, it is possible to obtain a motion blend image that is strongly affected by the attack motions D1 to D5 of FIG. 5 (the motion data MB) in the weapon portion (the end portion of the model object) and is also strongly affected by the transitional motions C1 to C5 of FIG. 5 (the motion data MA) in the pelvis portion (the central section of the model object). This is done by setting the individual blend ratio $\beta B$ of the attack motion (the motion data MB) to be higher in the weapon portion (B7) and the individual blend ratio βA of the transitional motion (the motion data MA) to be lower in the pelvis portion (B0).

With the thus configured embodiment, the introduction of individual blend ratios is successful in creating realistic, natural motion images that cannot be obtained by a general blend ratio alone.

If a general blend ratio is used to blend the transitional motions C1 to C5 of FIG. 5 and the attack motions D1 to D5 of FIG. 5, by way of example, the position of the weapon in the post-blend motion image will be modified to the position corresponding to the general blend ratio. The image of a weapon being flourished, such as that shown in D1 to D5 of FIG. 5, will therefore be lost from the post-blend motion image. Similarly, the representation of the image of the walking motion of the pelvis and feet, as shown at C1 to C5 in FIG. 5, will also be lost.

In contrast thereto, the use of individual blend ratios in accordance with this embodiment ensures that the weapon moves in substantially the same manner as the attack motion of D1 in D5 in FIG. 5 whereas the pelvis and feet move in substantially the same manner as the transitional motion of C1 to C5 in FIG. 5. It is therefore possible to represent a state in which a character is walking while flourishing a weapon, in a more realistic manner.

Moreover, the individual blend ratios can be made to change gradually in this embodiment, as shown in FIG. 4. It is therefore possible to create a motion blend image that appears to be natural, even when motions that appear to be completely different are blended, such as C1 to C5 and D1 to D5 in FIG. 5, preventing the player from feeling that this is the result of a motion blend.

2.4 Contact Response

In a fighting game using a weapon, it is desirable to give the impression of "contact response" and "hitting sensation". In other words, when a weapon such as a sword hits an enemy, it is preferable to implement an impression that the movement of the sword is momentarily halted and also the speed at which the sword is swung is slowed by the resistance of the enemy's body.

A method of producing a slow-motion image, such that the overall frame speed of the game is slowed from the instant at which a sword hits an enemy, could be considered as a first comparative example that gives the impression of "contact response". This first comparative example, however, certainly gives an impression of slow-motion to the player, but the player would consider it unnatural.

A method of slowing the forward speed of the player's own character from the instant at which the sword hits the enemy, on the other hand, could be considered as a second comparative example that gives the impression of "contact response". This second comparative example, however, only slows the movements of the player's character, so the movements of the player's character after the hit event has ended will seem unnatural.

This embodiment implements a representation of "contact response" by using the previously described individual blend ratios in the method described below.

Figure 7A:
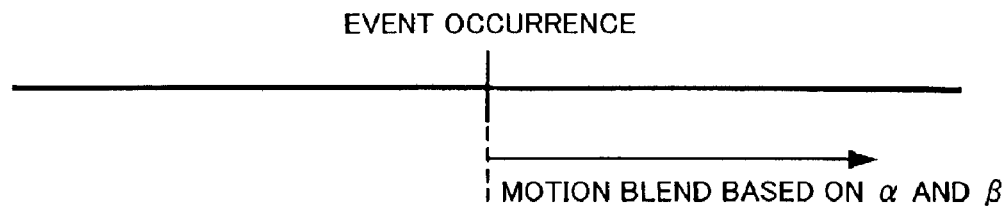
FIGS. 7A, 7B, 7C and 7D are illustrative of a method of motion blending based on a general blend ratio and individual blend ratios, on condition that an event has occurred.

In other words, this method ensures that a motion blend using the general blend ratio and individual blend ratios is performed, on condition that a given event has occurred, as shown in FIG. 7A.

Figure 7B:
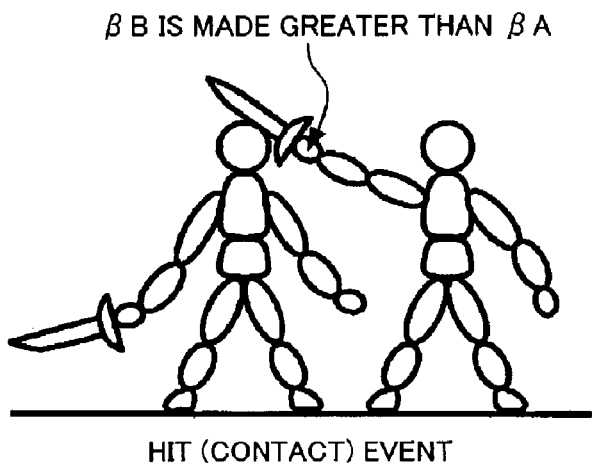
Figure 7C:
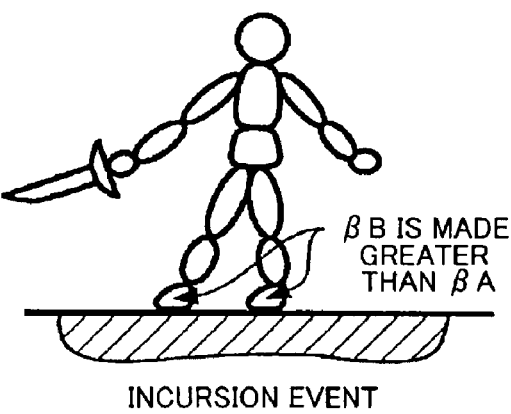
Figure 7D:
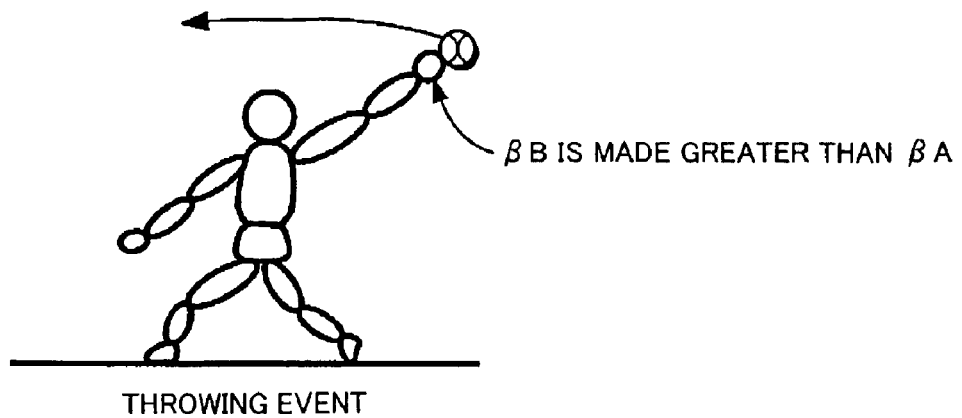

In this case, a given event could be a hit event (contact event) that occurs when a model object (the character's weapon) hits another object (an enemy character), as shown in FIG. 7B. Alternatively it could be an incursion event that occurs when a model object invades a given area (an area in which the movement of feet is restricted by means such as tar), as shown in FIG. 7C. Further alternatively, it could be a throwing event that occurs when the model object throws something (such as a ball or spear), as shown in FIG. 7D.

When one of these events occurs with this embodiment, the individual blend ratio of the bone that is most affected by that event (a bone related to that event, a bone linked to that event, or a bone that is close to the location at which the event occurred) is set in such a manner that the motion data MB (second motion data; the motion data blended with the first motion data after the event has occurred) is more than the motion data MA (first motion data; the motion data generated up until the occurrence of the event).

With the hit event shown in FIG. 7B, for example, the individual blend ratio βB of the weapon (hand) bone, which is the bone that ought to be affected by the hit event (the bone at the hit position or a bone close to the hit position), is made to be greater than βA. More specifically, the individual blend ratios βB are set as shown in FIG. 4. With the incursion event shown in FIG. 7C, the individual blend ratios βB of the feet bones, which are the bones that ought to be affected by the incursion event (the bones in contact with the ground surface in the incursion area, or bones close to the ground surface of the incursion area), are increased. With the throwing event shown in FIG. 7D, the individual blend ratio βB of the hand bone, which is the one that ought to be affected by the incursion event (the bone close to the thrown object), is increased.

In this manner, the bones that are most affected by the event can be made to move in the closest manner to the motion of MB, making it possible to create an image that conveys the event occurrence in an effective manner to the player.

An example in which the model object performs a vertical slashing motion during which there is no hit event is shown at G1 to G5 in FIG. 8. Conversely, an example in which the model object performs a vertical slashing motion during which there is hit event is shown at H1 to H6 in FIG. 8. In the event occurs, the motions H1 to H6 in FIG. 8 are created by blending the vertical slashing motions of G1 to G5 together with motions obtained by slowing the play speed of that vertical slashing motion and also by shifting the play frame numbers (play start frame) thereof backward.

As shown in FIG. 8, the position of the sword is substantially the same at G2 and H2. However, although the sword has moved downward in the downward stroke at G3, the movement of the sword has stopped at H3. The speed of the downward stroke of the sword is slowed, as shown at H4 and H5, and the time up until the sword passes through the enemy's body is long. The sword (hand) takes this path because the individual blend ratio βB is set to be large. In addition, the play speed of the motion data MB is slowed and the play frame numbers are shifted backward.

It is clear from a comparison of G3 and H5 in FIG. 8 that, although the position of the sword is substantially the same at G3 and H5, the movements of the pelvis and chest of the model object have progressed further forward in H5 than in G3. This is because the individual blend ratios βA of the main structural components such as the pelvis and chest have been increased (see FIG. 4).

In this manner, H1 to H6 in FIG. 8 show a movement wherein the overall movement of the model object is not slowed, but part (the weapon) thereof is slowed while the other portions (such as the pelvis and chest) move as normal (in accordance with the motion data MA). This therefore makes it possible to create a natural, realistic motion image, in comparison with the above described first comparative example in which the frame-advance speed of the entire game is slowed or the second comparative example in which the overall movement of the model object is slowed.

If images such as those of H1 to H6 of FIG. 8 can be created, it is simple to implement the processing of a "contact response" representation whereby the movement of the sword is halted momentarily by hitting the enemy and the speed at which the sword is swung subsequently is slowed by the resistance of the enemy's body.

Note that the method of this embodiment is particularly effective for representing this "contact response", but it is also effective for representing a "hitting sensation" when a kick or punch makes contact.

2.5 Changing the General Blend Ratio

This embodiment not only enables the setting of individual blend ratios, it also provides various means for setting the general blend ratios.

Figure 9A:
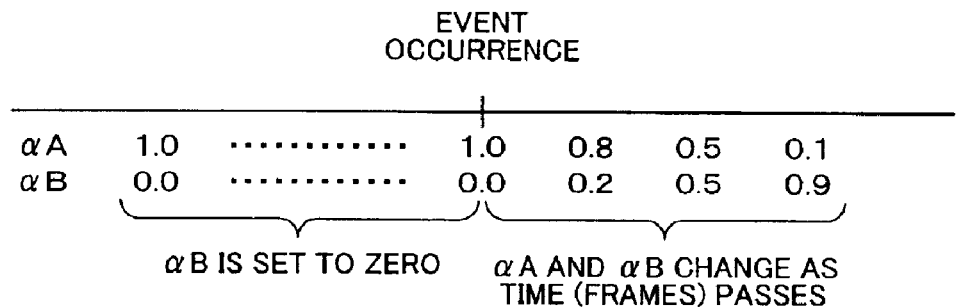
FIGS. 9A, 9B, and 9C are illustrative of a method of setting a general blend ratio and periods T1 and T2.

With this embodiment, the general blend ratio $\alpha B$ of the motion data MB (the second motion data) is set to zero up until the occurrence of an event (such as a hit event), as shown in FIG. 9A.

The setting of the general blend ratio $\alpha B$ to zero in this manner ensures that MB is substantially not blended, even when the motion data sets MA and MB are blended. As a result, the basic motion (main motion) can be played from the motion data MA with no effect due to the motion data MB, up to the point before the occurrence of the event. Since it is sufficient to set the general blend ratio $\alpha B$ to zero, this has the advantage of making the processing load extremely low.

If the transitional motion of C1 to C5 in FIG. 5 is blended with the attack motion of D1 to D5, by way of example, it is possible to make the model object perform a normal transitional motion, and thus create a natural image, by setting $\alpha B$ to zero for periods before the occurrence of the attack event.

With the vertical slashing motion of FIG. 8, it is possible to make the model object perform a vertical slashing motion, and thus create a natural image, by setting $\alpha B$ to zero for the periods before the hit event occurs (H1 and H2).

With this embodiment, the general blend ratios $\alpha A$ and $\alpha B$ (or either one of them) could be changed in accordance with the elapse of time (such as frame progress, elapse of virtual game time, or elapse of real time), as shown in FIG. 9A.

By making the general blend ratios change with time in this manner, it becomes possible to gradually strengthen or gradually weaken the effects of the motion data MB, and thus implement a wide range of image representations.

Figure 9B:
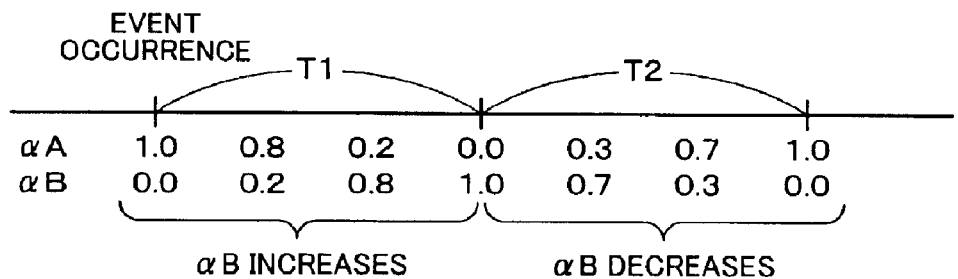

For example, the general blend ratio $\alpha B$ of the motion data MB could be made to increase with time up until the elapse of a period T1 (first period) during which an event occurs, as shown in FIG. 9B. After the period T1 has elapsed, the general blend ratio $\alpha B$ of the motion data MB is gradually reduced with time up until a period T2 has elapsed.

In this case, the period T1 could be the hit period of H2 to H5 of FIG. 8 (the point at which the sword passes through the enemy's body or the time at which the hit is determined), by way of example. The period T2 could be the point at which the motion of H5 and H6 of FIG. 8 returns (the point at which the motion returns to MA), by way of example.

The effects of the motion data MB are increased by increasing $\alpha B$ (or decreasing $\alpha A$) during the period T1, as shown in FIG. 9B. In other words, the movement of the sword can be slowed at T1, which is the hit period, by increasing the general blend ratio $\alpha B$ of the motion data MB (motion data in which the play time is slowed and the play frame numbers are shifted backward).

The effects of the motion data MB could be reduced, on the other hand, by reducing $\alpha B$ (or increasing $\alpha A$) during the period T2, as shown at FIG. 9B. In other words, the motion of the model object can be returned to the original MA motion at T2, which is the period for the return to that motion, by reducing general blend ratio $\alpha B$ of the motion data MB and increasing the general blend ratio of MA. If $\alpha B$ is returned to zero when the period T2 ends, the basic motion data MA is subsequently played as normal.

Figure 9C:
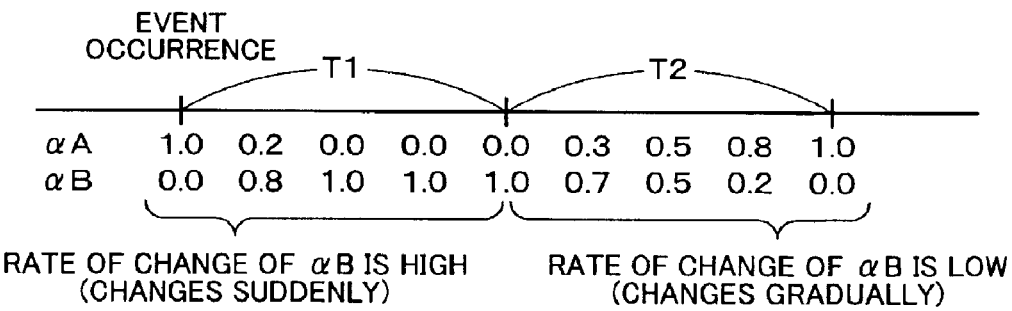

Note that it is preferable to make the rate of change of $\alpha B$ high at period T1 (increase it suddenly) and also make the rate of change of $\alpha B$ low during the period T2 (decrease it gradually), as shown in FIG. 9C.

Making $\alpha B$ change suddenly during the period T1 makes it possible to create an image such that the movement of the sword appears to slow suddenly and stop when it hits the enemy.

Making $\alpha B$ change slowly during the period T2, on the other hand, smoothes the return to the motion data MA, thus enabling the creation of an image that does not seem unnatural to the player.

Figure 10A:
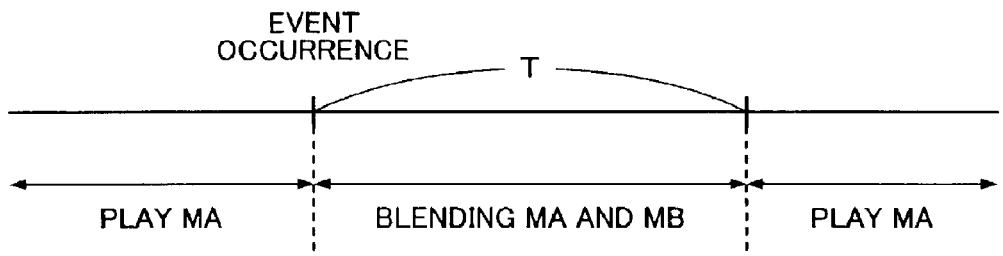
FIGS. 10A, 10B, and 10C are illustrative of a method of setting a general blend ratio and a period T.
Figure 10B:
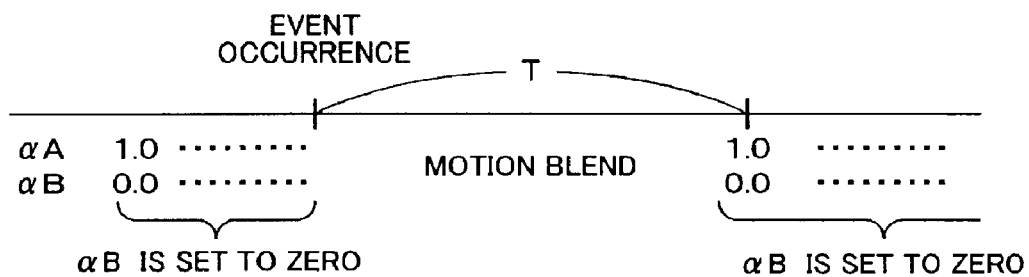

With this embodiment, the motion data MA is played at periods before the event occurs, so that the model object performs the MA motions, as shown in FIG. 10A. This can be implemented by setting the general blend ratio $\alpha B$ of the motion data MB to zero, as shown in FIG. 10B. When the event occurs, the sets of motion data MA and MB are blended. When the period T (T1+T2) has elapsed after the event occurred, the motion blend ends and the motion of the model object again returns to MA. This can be implemented by setting the general blend ratio $\alpha B$ of the motion data MB to zero, as shown in FIG. 10B.

This changing of general blend ratios makes it possible to represent motions such as the normal running followed by an attack while running when an attack event occurs, and returning to the normal running after the period T has elapsed, as shown in FIGS. 5 and 6 by way of example. It also makes it possible to represent the motion of a normal vertical slashing motion before a hit event, a vertical slashing motion exhibiting a "contact response" when a hit event occurs, and a return to the normal vertical slashing motion after the period T has elapsed, as shown at H1 to H6 in FIG. 8.

Figure 10C:
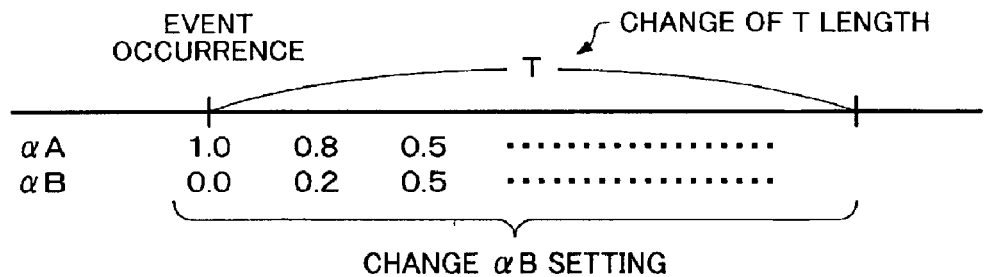

Note that it is preferable that the length of the period during which the motion blend is done or the setting of the general blend ratio $\alpha B$ ($\alpha A$) in the period T is made to differ in accordance with the event that has occurred, the status information for the model object, or the status information for the object that is hit, as shown in FIG. 10C.

If the event that occurs in the attack event shown in FIGS. 5 and 6, byway of example, the period T could be adjusted to match the play time for the attack motion and also $\alpha B$ could be set to 1.0 immediately after the occurrence of the attack event and $\alpha B$ could be returned to 0.0 as soon at the period T has elapsed. If the event that occurs is the hit event shown in FIG. 8, on the other hand, the period T (T1+T2) and $\alpha B$ could be set as shown in FIG. 9B or FIG. 9C.

It is also possible to base the setting of the length of the period T and $\alpha B$ on the type of weapon used by the model object and the capabilities of the model object (generally speaking: the status information for the model object), or the defensive measures and capabilities of the enemy that is hit thereby (generally speaking: the status information for the enemy). If the sword of the model object is a good sword, for example, the period T could be shortened if the capabilities of the model object are high. Alternatively, if the enemy has good defensive measures or if the enemy has high capabilities, the period T could be lengthened and the α value could be set so that the sword appears to be stopped thereby.

2.6 Control of Play Speed and Play Frame Number

To represent the "contact response" shown by H1 to H6 in FIG. 8 with this embodiment, the motion data MB that is blended with the motion data MA could be as described below.

In other words, data that is the same as MA is initially used as the motion data MB. If MA is vertical slashing motion data, by way of example, vertical slashing motion data could be used as MB as well. The motion data MA with different play speed and play frame numbers could be set in MB.

Figure 11A:
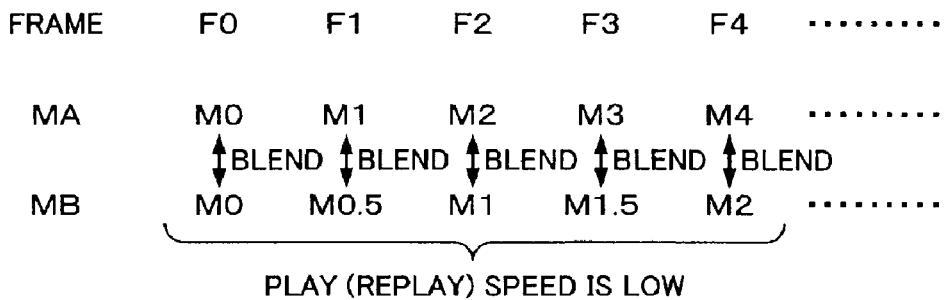
FIGS. 11A, 11B, and 11C are illustrative of a method of blending sets of motion data which have different play speeds and play frame numbers.

Assume that the motion data MA is configured of motion data M0, M1, M2, M3, M4, etc., for each frame, as shown by way of example in FIG. 11A. Similarly, the motion data MB is also configured of motion data M0, M1, M2, M3, M4, etc., for each frame.

In FIG. 11A, however, it should be noted that the play speed of MB is slower than that of MA. This could be implemented by playing M0, M1, M2, M3, M4, etc., of MA at frames F0, F1, F2, F3, F4, etc., while playing M0, M0.5, M1, M1.5, M2, etc., of MB at frames F0, F1, F2, F3, F4, etc. This makes it possible to halve the play speed of MB. In this case, M0.5 is a motion that is interpolated (blended) from M0 and M1 and M1.5 is a motion that is interpolated from M1 and M2.

It is possible to turn the image that is created in the hit period into a slow-motion image (in which only the sword portion is in slow-motion) by blending the motions of MA with those of MB at half the play speed, thus enabling the representation of the "contact response" shown at H1 to H6 in FIG. 8.

Note that if the play speed of MB is reduced to ⅓, motions M0, M1/3, M2/3, M1, M4/3, etc., could be played in frames F0, F1, F2, F3, F4, etc.

Figure 11B:
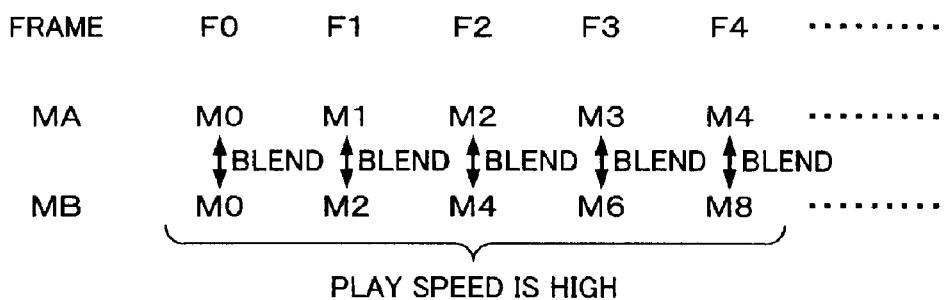

The play speed of MB could also be made faster than that of MA, as shown in FIG. 11B. This could be implemented by playing M0, M1, M2, M3, M4, etc., of MA at frames F0, F1, F2, F3, F4, etc., while playing M0, M2, M4, M6, M8, etc., of MB at frames F0, F1, F2, F3, F4, etc. this makes it possible to double the play speed of MB.

Note that if the play speed of MB is tripled, motions M0, M3, M6, M 9, M12, etc., could be played in frames F0, F1, F2, F3, F4, etc.

Figure 11C:
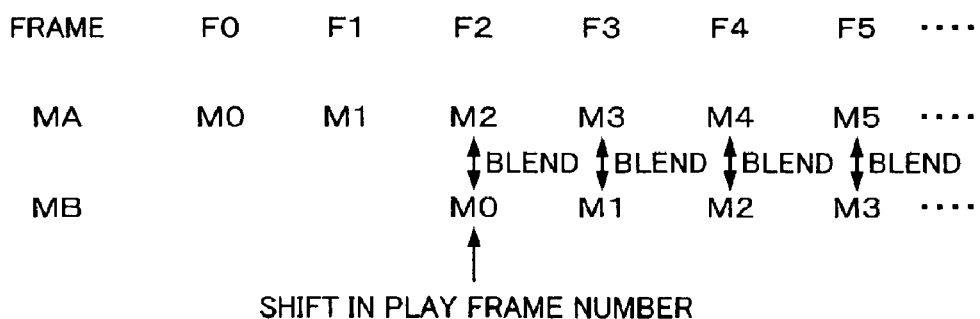

The play frame numbers of MB (numbers indicating which frame of the motion data is to be played) could be shifted, as shown in FIG. 11C. More specifically, M0, M1, M2, M3, M4, M5, etc., of MA are played in frames F0, F1, F2, F3, F4, F5, etc., while M0, M1, M2, M3, etc., of MB are played in frames F2, F3, F4, F5, etc., with the play frame number being shifted backwards.

By blending MB having the backward shifted play frame number and MA in the hit period, an image to be generated in the hit period can be made a slow-motion image or a freeze image, enabling representation of "contact response" as shown by H1 to H6 in FIG. 8.

Note that the speed of passage of the sword through the enemy's body during H3 to H5 of FIG. 8 can be slowed by making the MB play speed even slower. This enables representation of the degree of resistance of the enemy's body.

Similarly, it is possible to lengthen the time during which the sword is halted on hitting the enemy (or the rebound time), as at H2 in FIG. 8, by shifting the play frame number of MB backward. This enables representation of how the sword halts (or rebounds) at the instant it hits the enemy.

2.7 Motion Scripts and Parallel Operation of Motion Control Sections

With this embodiment, a plurality of motion control sections that can operate in parallel use motion scripts to control the motions of the model object.

For example, this embodiment could be provided with a group of motion scripts (generally speaking: a first group of scripts; hereinafter the same) for transition transitional relationships) and a group of motion scripts (generally speaking: a second group of scripts; hereinafter the same) for attacks (attack relationships) as shown in FIG. 12, by way of example.

This group of transitional motion scripts comprises various motion scripts relating to transition, such as scripts for a standing motion, a forward-transitional motion, a rearward-transitional motion, a rightward-transitional motion, a leftward-transitional motion, a jumping motion, and a squatting motion.

The group of attack motion scripts, on the other hand, comprises various motion scripts relating to attack, such as scripts for a vertical slashing motion, a horizontal slashing motion, a kicking motion, a throwing motion, a guarding motion, a special attack (killing trick) motion A, and a special attack motion B.

With this embodiment, the group of transitional motion scripts is allocated to a motion control section on a main side (generally speaking: a first motion control section; hereinafter the same) and the group of attack motion scripts is allocated to a motion control section on a sub side (generally speaking: a second motion control section; hereinafter the same).

In other words, the operation of the main-side motion control section is based on a transitional motion script (a script for a standing motion or forward-transitional motion) that is allocated from the group of transitional motion scripts, to select transitional motion data corresponding to that transitional motion script and thus control the transitional motions of the model object.

The operation of the sub-side motion control section, on the other hand, is based on an attack motion script (a script for a vertical slashing motion or horizontal slashing motion) that is allocated from the group of attack motion scripts, to select attack motion data corresponding to that attack motion script and thus control the attack motions of the model object.

Note that the description below mainly concerns an example of the use of two motion control sections that can operate in parallel, but the present invention can also be applied to the use of three or more motion control sections that can operate in parallel.

Within a motion script (a script in which is defined a motion control processing sequence) in accordance with this embodiment is defined the motion data that is currently selected by the motion control section to which this motion script is allocated, as well as a motion script switching condition. In other words, the motion control section selects motion data in correspondence with that motion script, performs motion control processing, and also determines whether or not the motion script switching condition has been satisfied. If it has been satisfied, it then changes the motion script that is allocated to the motion control section (either itself of another motion control section).

Figure 13:
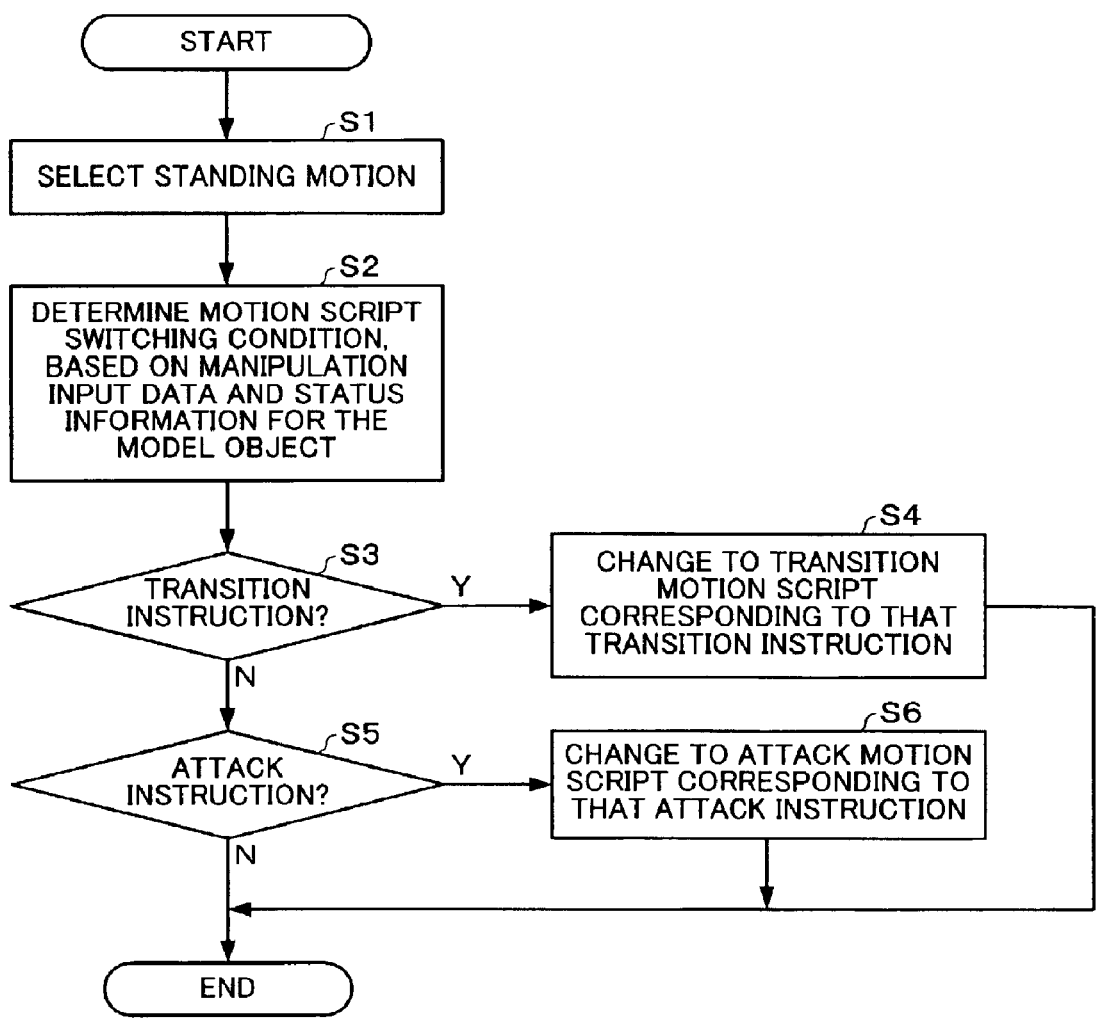
FIG. 13 is a flowchart illustrating an example of processing a standing motion script.

A flowchart relating to an example of processing for a standing motion script is shown in FIG. 13, by way of example.

With this standing motion script, standing motion data is first selected (step S1). A motion script switching condition is then determined, based on manipulation input (manipulation data from operating buttons or joystick) and status information for the model object (the current situation of the model object) (step S2).

If the manipulation input is a transition instruction, the flow changes to the transitional motion script corresponding to the direction of that transition instruction (steps S3 and S4). For a forward transition instruction, by way of example, the motion script allocated to the main-side motion control section changes to a forward-transitional motion script, which is a right-transitional motion script for a right-transition instruction.

If the manipulation input is an attack instruction, on the other hand, the flow changes to the attack motion script corresponding to the attack instruction (steps S5 and S6). For a vertical slash instruction, for example, the allocation of the motion script to the sub-side motion control section changes to a vertical slashing motion script, whereas for a horizontal slash instruction, it changes to a horizontal slashing motion script.

Figure 14:
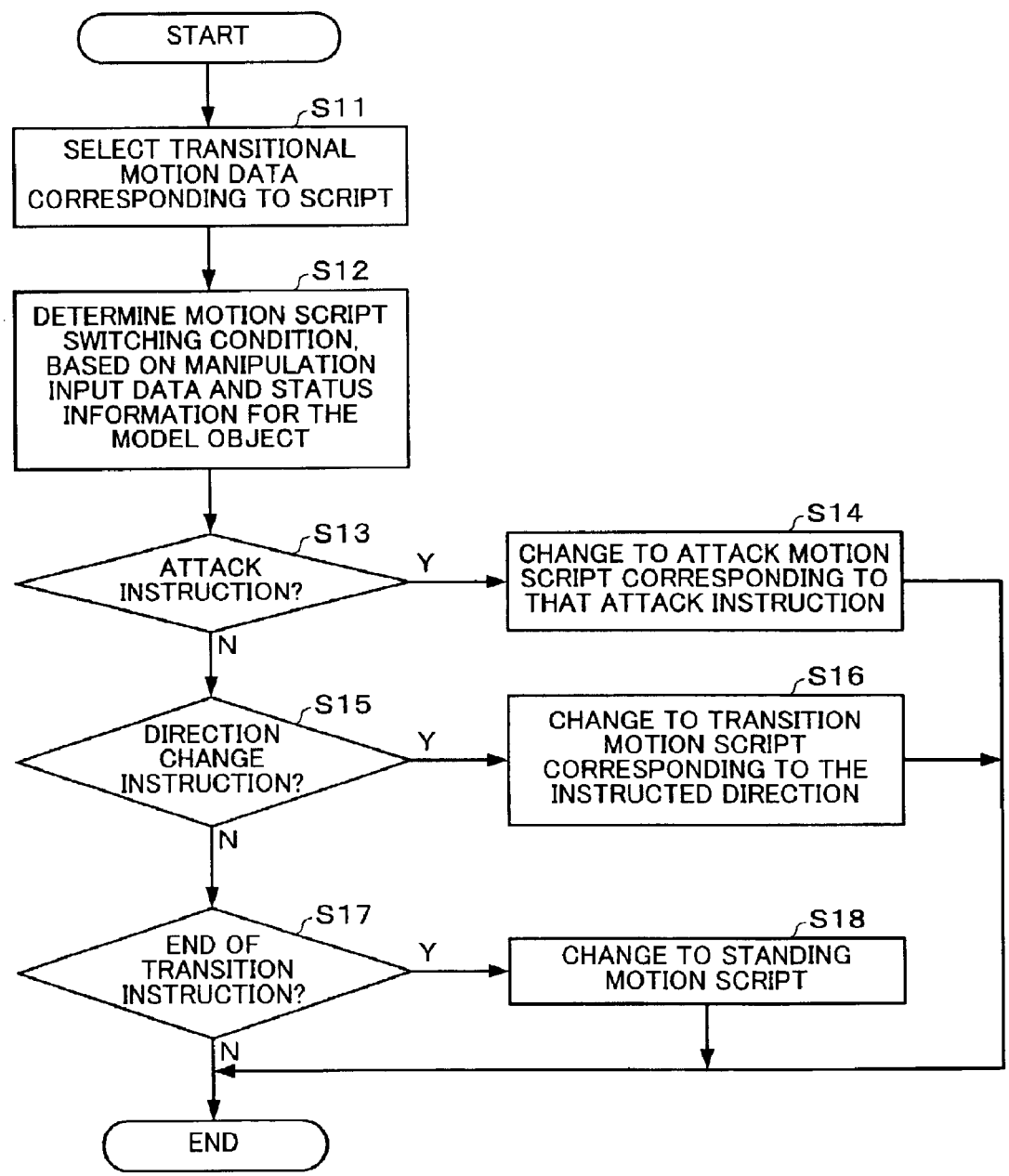
FIG. 14 is a flowchart illustrating an example of processing a transitional motion script.

A flowchart relating to an example of processing for a transition (such as a forward transition or a rearward transition) motion script is shown in FIG. 14, by way of example.

First of all, the transitional motion data corresponding to the script is selected (step S11). The switching condition for the motion script is then determined, based on the manipulation input and status information for the model object (step S12).

If the manipulation input is an attack instruction, the system changes to the attack motion script corresponding to the attack instruction (steps S13 and S14).

If the manipulation input is a direction-change instruction, on the other hand, the system changes to the transitional motion script corresponding to the changed direction (steps S15 and S16). If the current transitional motion is in the forward direction and a change to the leftward direction is instructed, by way of example, the allocation of the motion script to the main-side motion control section changes to a left-transitional motion script.

When the transition instruction input ends (when the joystick is returned to the neutral position, the system changes to the standing motion script (steps S17 and S18). In other words, the allocation of the motion script to the main-side motion control section changes to a standing motion script.

Figure 15:
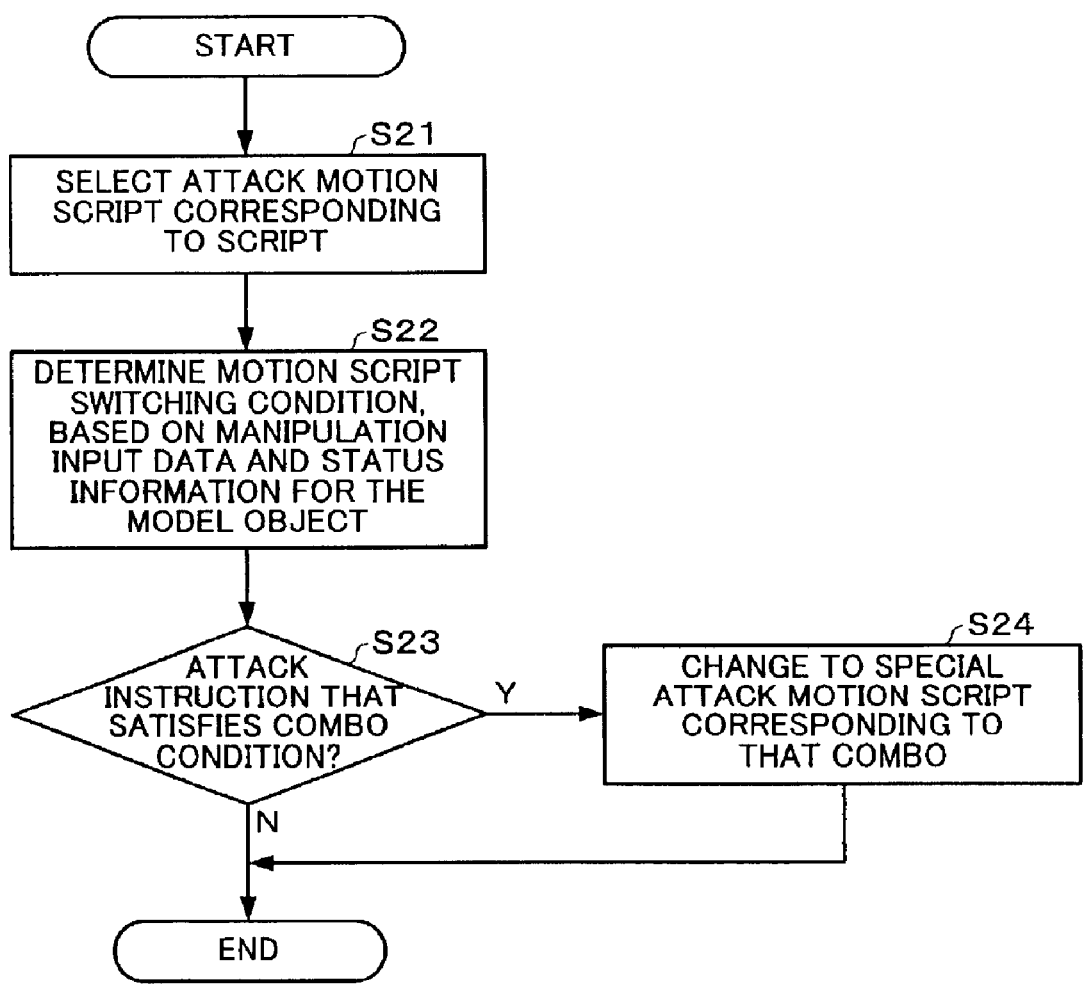
FIG. 15 is a flowchart illustrating an example of processing an attack motion script.

A flowchart relating to an example of script processing for attack motions (such as vertical or horizontal slashing) is shown in FIG. 15.

First of all, the system selects attack motion data corresponding to the script (step S21). It then determines a switching condition for the motion script, based on manipulation input and status information for the model object (step S22).

If an attack instruction that satisfies a combo condition is executed by the manipulation input, the system changes to the special attack motion script corresponding to that combo (steps S23 and S24). In other words, the allocation of the motion script to the sub-side motion control section changes to the special attack motion script.

With this embodiment of the invention, the motion control sections on the main and sub sides use such motion scripts to operate in parallel, as described below.

Figure 16A:
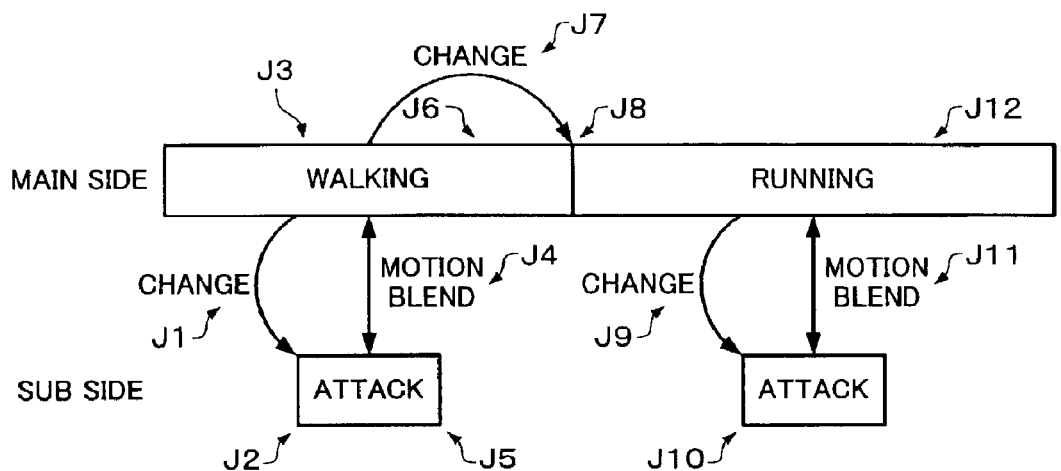
FIGS. 16A, 16B, and 16C are illustrative of the parallel operation of the motion control sections.

Assume, by way of example, that a walking motion script is allocated to the main-side motion control section and a manipulation input for an attack instruction is executed while the walking motion is being executed, as shown in FIG. 16A. In such a case, a switching condition defined in the main-side walking motion script is satisfied at J1 in FIG. 16 and an attack motion script is allocated to the sub-side motion control section. This starts the operation of the sub-side motion control section (puts it into a executing state) at J2, and selects the attack motion data With this embodiment, the main-side motion control section (first motion control section) thus continues to provide motion control based on the walking motion script (a motion script from among the group of transitional motion scripts shown in FIG. 12), even if the switching condition to the attack motion script (a motion script from among the group of attack motion scripts shown in FIG. 12) is satisfied and the sub-side motion control section (second motion control section) starts motion control based on the attack motion script, as shown at J3 in FIG. 16A.

It is therefore possible to blend the motion data of the main-side motion control section and the motion data of the sub-side motion control section, as shown at J4 in FIG. 16A. This enables the play of a walking/attack motion that is an attack while walking, as shown in FIG. 6. When the play time for the attack motion ends, the operation of the sub-side motion control section ends as shown at J5 in FIG. 16A, and the motion of the model object returns to the walking motion at J6.

If a manipulation input that instructs running is executed, a switching condition defined in the main-side walking motion script is satisfied at J7 and a running motion script is allocated to the main-side motion control section. This makes the main-side motion control section select running motion data, and a running motion is played.

If an manipulation input that instructs an attack is subsequently executed, a switching condition defined in the main-side walking motion script is satisfied at J9 and an attack motion script is allocated to the sub-side motion control section. This starts the operation of the sub-side motion control section (puts it into an executing state) at J10, and selects the attack motion data.

When that happens, the motion data of the main-side motion control section and the attack motion data of the sub-side motion control section are blended, as shown at J11, to play a running/attack motion. When the play time for the attack motion ends, the operation of the sub-side motion control section ends as shown at J12, and the motion of the model object returns to the running motion.

In the manner described above, this embodiment makes it possible to generate walking/attack motion data or running/attack motion data by blending data. Since it is therefore not necessary to prepare data such as walking/attack motion data or running/attack motion data beforehand, it enables a large reduction in the amount of motion data. This embodiment also enables the use of motion blends to create a wide range of motion data by using blends, by combining main-side motion data and sub-side motion data, making it possible to implement the representation of a wide range of motions with a small amount of data.

By enabling simultaneously operation of the main-side motion control section and the sub-side motion control section, this embodiment ensures that there is no need to prepare motion scripts such as a walking/attack motion script and a running/attack motion script beforehand. For that reason, the amount of motion script data can be greatly reduced. Moreover, this embodiment makes it possible to implement a wide range of motion scripts by combining main-side motion scripts and sub-side motion scripts.

Note that the sub-side motion control section can also change the motion script allocated to itself.

Figure 16B:
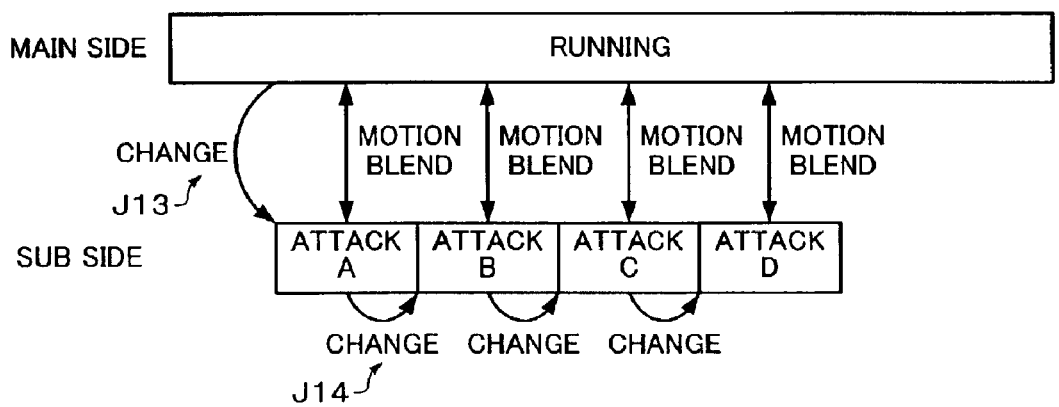

If a manipulation input instructing an attack is executed while the main-side motion control section is playing a running motion, as shown by way of example at J13 in FIG. 16B, the motion script for attack A is allocated to the sub-side motion control section. This causes the sub-side motion control section to select the motion data for attack A and blend the running motion and the attack A motion.

If an attack instruction that satisfies a combo condition is subsequently executed, the switching condition that was defined in the motion script of the sub-side motion control section is satisfied at J14 and the motion data for attack B is allocated to the sub-side motion control section. This causes the sub-side motion control section to select the motion data for attack B and blend the running motion and the attack B motion.

If attack instructions that satisfy combo conditions are subsequently executed in sequence, motion scripts for attack C and attack D are allocated to the sub-side motion control section so that the running motion is blended with the motions for attacks C and D. The play subsequently returns to that of the running motion.

The sub-side motion control section can also change the motion script allocated to the main-side motion control section.

Figure 16C:
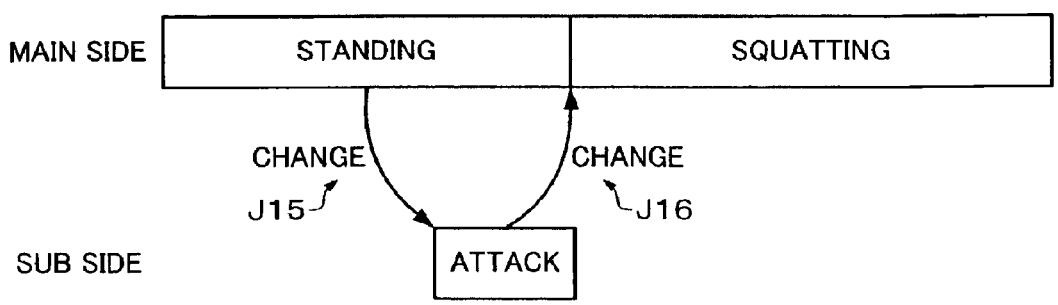

If a manipulation input instructing an attack is executed while the main-side motion control section is playing a running motion, as shown by way of example at J15 in FIG. 16C, the main-side running motion is blended with the sub-side attack motion.

If the final state of the sub-side attack motion is a squatting motion, the switching condition defined in the sub-side motion control section is satisfied at J16 and the squatting motion script is allocated to the main-side motion control section. This causes the main-side motion control section to select the squatting motion data and play a squatting motion.

With this embodiment as configured above, each motion control section cannot only change the motion script allocated to itself, it can also change the motion script allocated to the other motion control section. It is therefore necessary to define motion scripts beforehand, from consideration of preventing the creation of an unnatural image due to a change in the motion script allocation.

If the sub side were to change the main-side motion script at J16 of FIG. 16C while the main side is playing a collapsing motion and the main side were to return to that collapsing motion, by way of example, an unnatural image would be created in which the model object that has collapsed stands up again and then collapses again. In such a case, therefore, it is preferable to limit the changes of main-side motion script by the sub side.

Note that motion blend processing could be performed by allocating a transitional motion script to the main-side motion control section (the first motion control section) and a recoiling motion script (generally speaking: a script for a motion of reacting to an attack; hereinafter the same) is allocated to the sub-side motion control section (the second motion control section).

This makes it possible to create a motion blend image in which part of the model object (such as the upper or lower part thereof) performs are coiling motion while other portions thereof perform a transitional motion.

In such a case, the configuration could be such that the transitional motion script is set to accept a manipulation input relating to a transition instruction and also the recoiling motion script is set to not accept a manipulation input relating to attack (or defense). This makes it possible for the player to make the model object move in accordance with a transition instruction even if part of the model object is performing a recoiling motion. On the other hand, since a model object that has performed a recoiling motion could be placed in an immovable state (unconscious state) at a given period because of an enemy attack, the player could find it impossible to make the model object perform an attack (or defense).

3. Processing of This Embodiment

Figure 17:
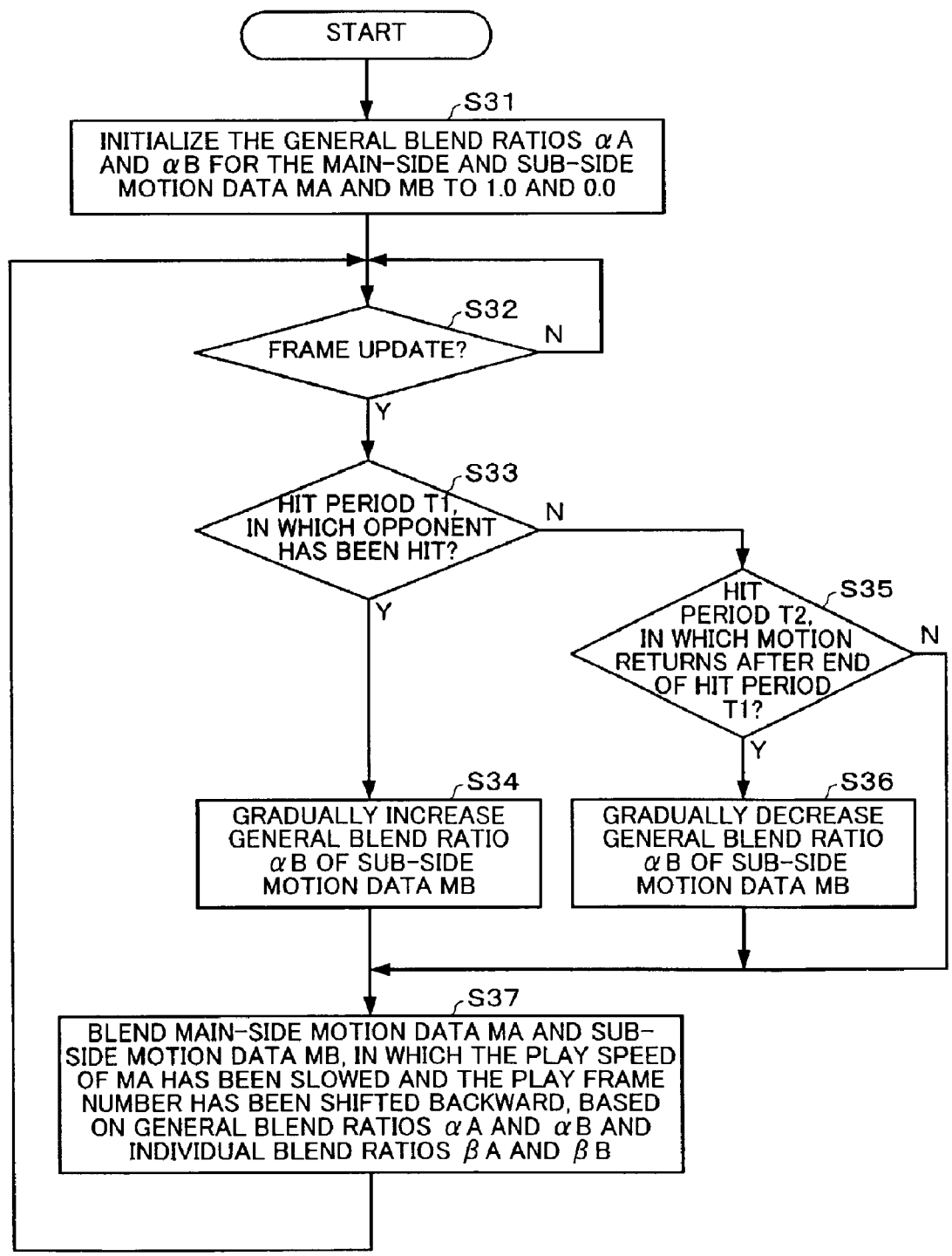
FIG. 17 is a flowchart of a detailed example of the processing of one embodiment of the present invention.
Figure 18:
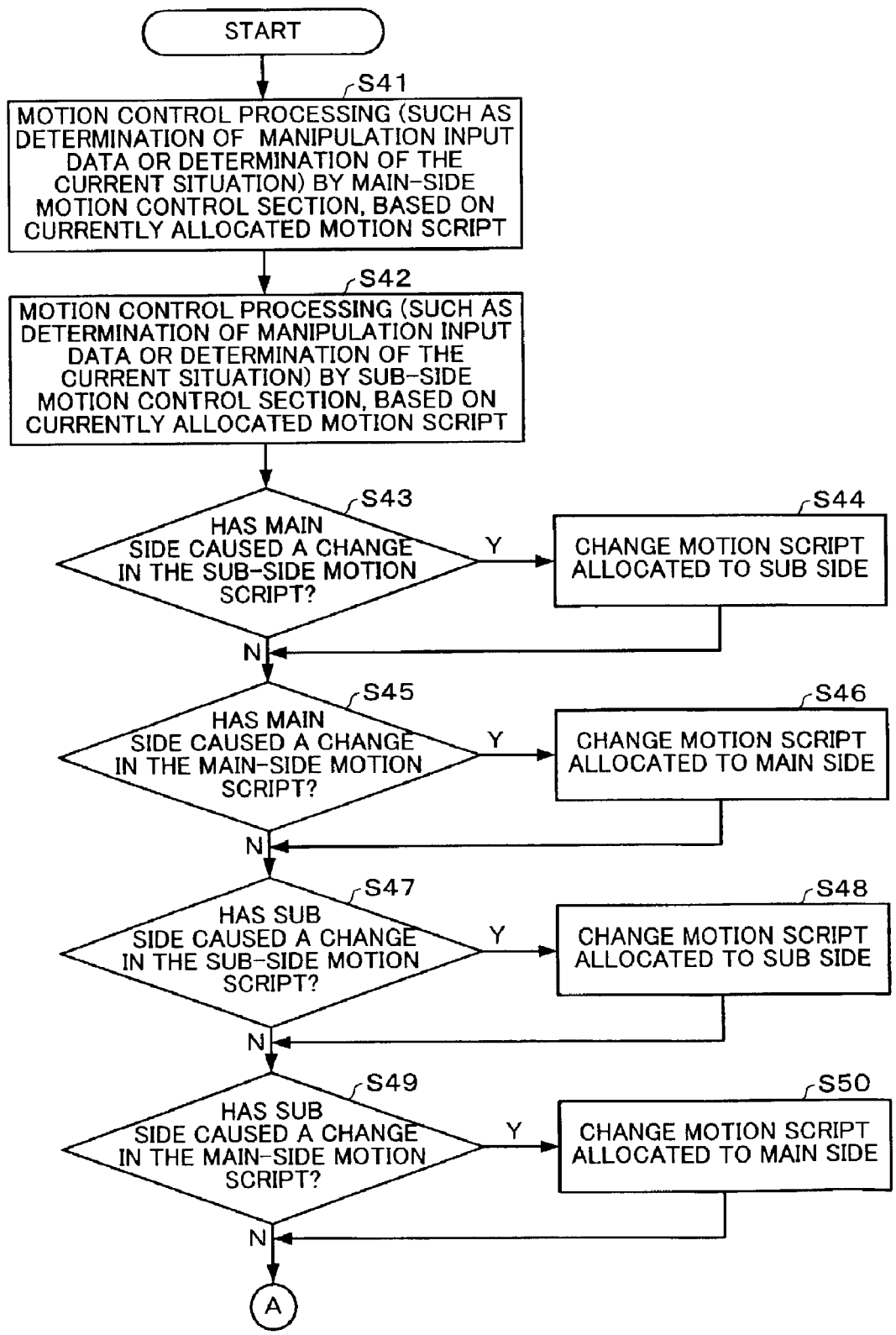
FIG. 18 is another flowchart of a detailed example of the processing of one embodiment of the present invention.
Figure 19:
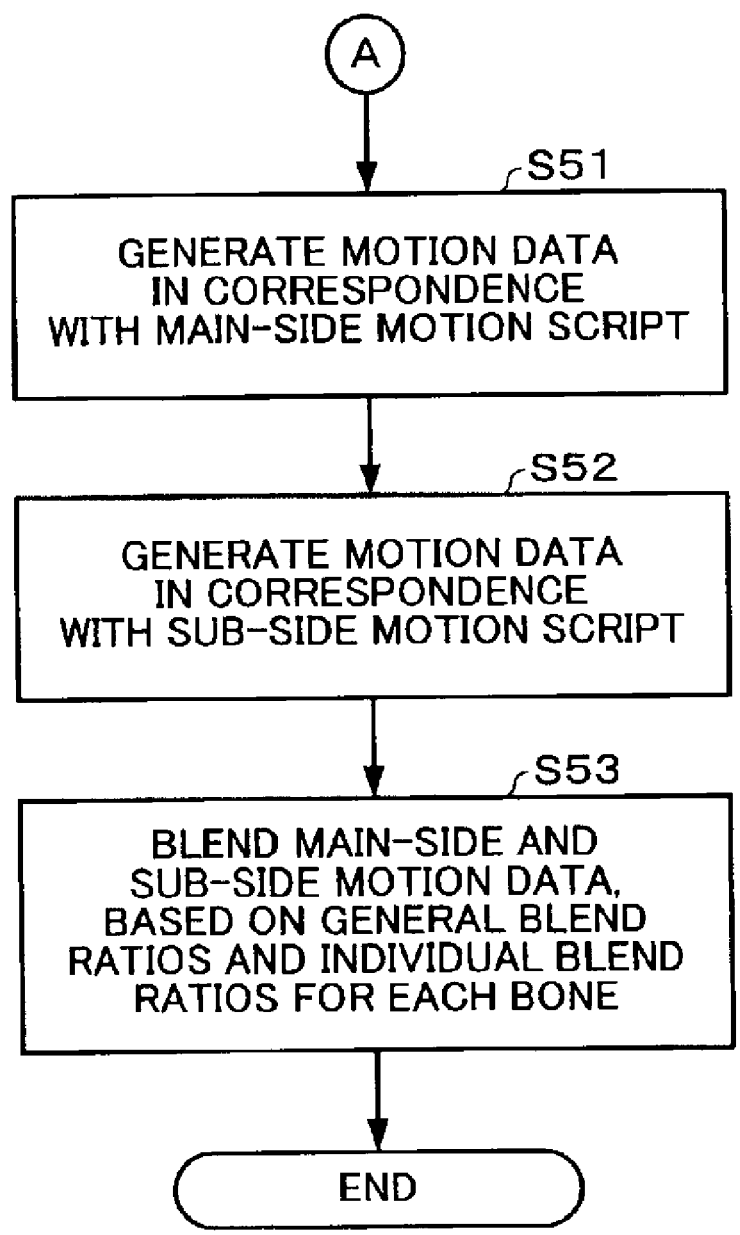
FIG. 19 is a further flowchart of a detailed example of the processing of one embodiment of the present invention.

The description now turns to details of the processing of this embodiment of the present invention, with reference to the flowcharts shown in FIGS. 17, 18, and 19.

FIG. 17 is a flowchart of the motion blend processing described with reference to FIGS. 8 to 11C.

First of all, the general blend ratios $\alpha A$ and $\alpha B$ of the main-side and sub-side the motion data MA and MB are initialized to 1.0 and 0.0 (step S31).

The system then determines whether or not there is a frame update (step S32). This can be determined by detecting whether or not the vertical synchronization signal that is output from the display section is active.

If there is a frame update, the system determines whether or not it is the period T1 at which the attack hits the opponent (step S33). If it is the period T1, the general blend ratio $\alpha B$ of the motion data MB on the sub side is gradually increased (step S34; see FIG. 9B and FIG. 9C).

If it is not the period T1, on the other hand, the system determines whether or not it is the period T2 at which motion resumes after the end of the hit period T1 (step S35). If it is the period T2, the general blend ratio $\alpha B$ of the motion data MB on the sub side is gradually reduced (step S36).

The main-side motion data MA and the sub-side motion data MB, in which the play speed of MA has been slowed and the play frame number has been shifted backward, is then motion-blended, based on the general blend ratios $\alpha A$ and $\alpha B$ and the individual blend ratios $\beta A$ and $\beta B$ (step S37; see FIGS. 11A, 11B, and 11C). The flow then returns to step S32, to wait for the next frame update.

FIGS. 18 and 19 are flowcharts of the implementation of the motion blend processing by the parallel operations of the motion control sections that was described with reference to FIGS. 12 to 16C.

First of all, the main-side motion control section performs motion control processing (such as determination of manipulation input or determination of the current situation), based on the motion script that is currently allocated to the main-side motion control section (step S41) The sub-side motion control section then performs motion control processing (such as determination of manipulation input or determination of the current situation), based on the motion script that is currently allocated to the sub-side motion control section (step S42).

If the main side has caused a change in the motion script on the sub side, the motion script allocated to the sub side changes (steps S43 and S44; see J1 and J9 of FIG. 16A). If the main side has caused a change in the motion script on the main side, the motion script allocated to the main side changes (steps S45 and S46; see J7 of FIG. 16A).

If the sub side has caused a change in the motion script on the sub side, the motion script allocated to the sub side changes (steps S47 and S48; see J14 of FIG. 16B). If the sub side has caused a change in the motion script on the main side, the motion script allocated to the main side changes (step S50; see J16 of FIG. 16C).

Motion data is then created in correspondence with the main-side motion script (step S51). If the main-side motion control section has selected a right-transitional motion and a forward-transitional motion, by way of example, those motions are blended to create a right-forward-transitional motion. Motion data is then created in correspondence with the sub-side motion script (step S52). If the sub-side motion control section has selected a horizontal slashing motion and a vertical slashing motion, by way of example, these motions are blended to create a diagonal slashing motion.

The sets of main-side and sub-side motion data are then blended, based on the general blend ratios and individual blend ratios for each bone, and the thus-obtained motions are played (step S53).

4. Hardware Configuration

Figure 20:
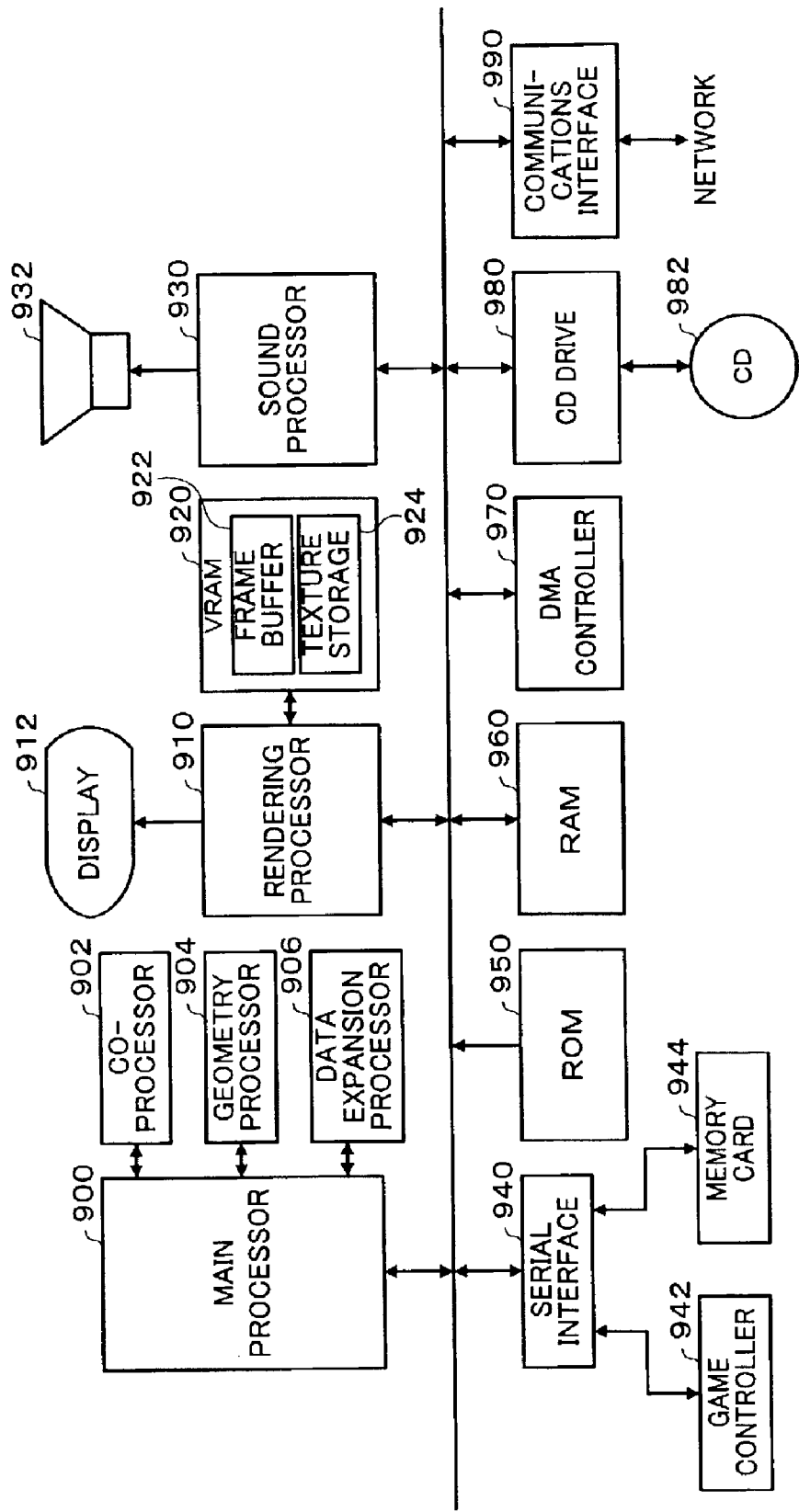
FIG. 20 shows an example of a hardware configuration that can implement one embodiment of the present invention.

The description now turns to an example of a hardware configuration that can implement this embodiment of the present invention, with reference to FIG. 20.

A main processor 900 executes various different types of processing such as transitional actions, game processing, image processing, and sound processing, based on a program stored in a CD 982 (an information storage medium), a program transferred through a communications interface 990, or a program stored in a ROM 950 (an information storage medium).

A co-processor 902 is intended to supplement the processing of the main processor 900 and comprises product-summers and dividers that enable high-speed parallel computations, to execute matrix computations (vector computations) at high speed. When matrix computations or the like are necessary in a physical simulation for making an object move and act, by way of example, a program running on the main processor 900 will instruct (request) the co-processor 902 to perform that processing.

A geometry processor 904 is designed to perform geometrical processing such as coordinate transformation, perspective transformation, light-source computation, and curved surface generation and comprises product-summers and dividers that enable high-speed parallel computations, to execute matrix computations (vector computations) at high speed. When processing such as coordinate transformation, perspective transformation, or light-source computation is performed, by way of example, a program running on the main processor 900 will instruct the geometry processor 904 to perform that processing.

A data expansion processor 906 expands and decodes compressed image and sound data, and performs processing to accelerate the decoding of the main processor 900. This ensures that moving images that have been compressed by the MPEG method or the like can be displayed during an opening screen, intermission screen, ending screen, or game screens. Note that the image and sound data to be decoded is stored in the ROM 950 or the CD 982, or it is transferred from the exterior through the communications interface 990.

A rendering processor 910 is designed to render (draw) an object made up of primitive surfaces such as polygons or curved surfaces, at high speed. During the rendering of the object, the main processor 900 utilizes the functions of a DMA controller 970 to pass object data to the rendering processor 910 and also transfer textures in a texture storage section 924, if necessary. When that happens, the rendering processor 910 renders the object into a frame buffer 922 at high speed, based on this object data and textures, while utilizing a Z buffer or the like to erase hidden surfaces. The rendering processor 910 can also perform processing such as alpha blending (translucency processing), depth queuing, MIP mapping, fog effects, bilinear filtering, trilinear filtering, anti-aliasing, and shading. When images for one frame are written to the frame buffer 922, those images are displayed on a display 912.

A sound processor 930 incorporates a multi-channel ADPCM audio source or the like and generates high-quality game sounds such as background music, sound effects, and voices. The thus-created game sounds are output from a speaker 932.

Manipulation data from a game controller 942 (such as a joystick, buttons, casing, or a bat-shaped or handgun-shaped controller) and save data and personal data from a memory card 944 are transferred through a serial interface 940.

A system program or the like is stored in the ROM 950. Note that the ROM 950 would function as an information storage medium if the system is an arcade game system, and various different programs would be stored in the ROM 950. Note also that a hard disk could be utilized instead of the ROM 950.

A RAM 960 is used as a work area for the various processors.

The DMA controller 970 controls DMA transfer between the processors and memory (such as RAM, VRAM, or ROM).

A CD drive 980 drives the CD 982 (information storage medium) which contains data such as a program, image data, and sound data, enabling access to that program and data.

The communications interface 990 provides an interface for data transfer to and from external devices over a network. In this case, a communications network (analog telephone line or ISDN) or high-speed serial interface bus could be considered as the network connected to the communications interface 990. The use of a communications network would make it possible to transfer data via the Internet. The use of a high-speed serial interface bus would also make it possible to transfer data to and from other devices such as another image generation system.

Note that the various processes of the present invention could be implemented by hardware alone or they could be implemented by a program stored in an information storage medium or a program distributed through a communications interface. Alternatively, they could be implemented by both hardware and programming.

If the various processes of the present invention are implemented by both hardware and a program, a program (program and data) for implementing the processes of the present invention in hardware is stored in the information storage medium. More specifically, this program instructs the processors 902, 904, 906, 910, and 930, which are hardware, and also transfers data if necessary. The processors 902, 904, 906, 910, and 930 implement the various processes in accordance with the present invention, based on these instructions and the transferred data.

Figure 21A:
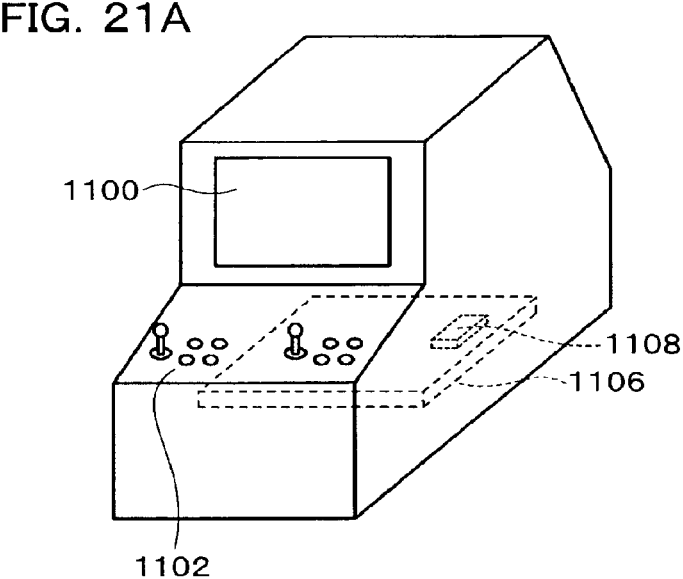
FIGS. 21A, 21B, and 21C show examples of various different systems to which one embodiment of the present invention is applied.

An example of this embodiment applied to an arcade game machine (image generation system) is shown in FIG. 21A. A player enjoys this game by operating controls such as a controller 1102 while viewing a game image shown on a display 1100. Components such as various processors and memory units are mounted on an internal system board (circuit board) 1106. A program (data) for implementing the various processes of the present invention is stored in memory 1108 that is an information storage medium on the system board 1106. This program is hereinafter called a stored program (stored information).

Figure 21B:
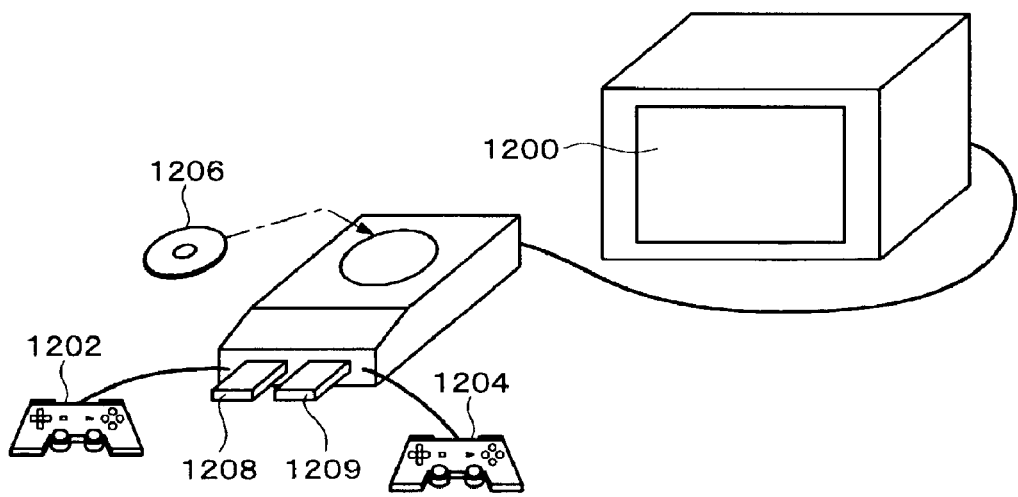

An example of this embodiment of the invention applied to a domestic game machine (image generation system) is shown in FIG. 21B. Players enjoy the game by manipulating controllers 1202 and 1204 while viewing a game image shown on a display 1200. In this case, the above described stored program (stored information) is stored in a CD 1206 or memory cards 1208 and 1209, which are information storage media that can be freely inserted into and removed from the main unit of the system.

Figure 21C:
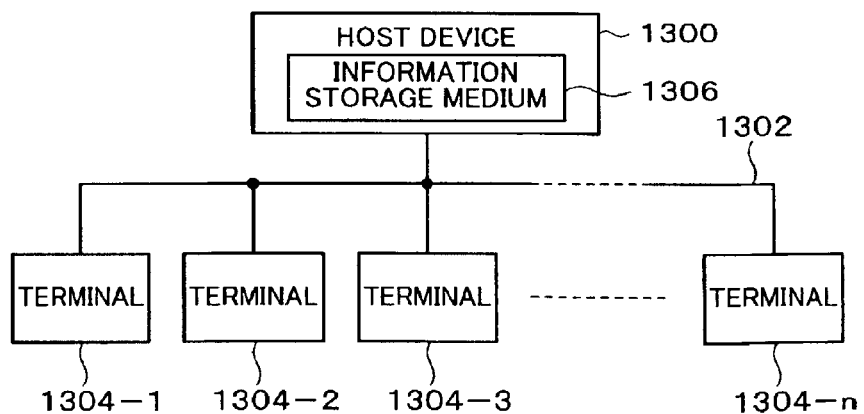

An example of this embodiment applied to a system is shown in FIG. 21C, where the system comprises a host device 1300 and terminals 1304-1 to 1304-n (game machines or mobile phones) that are connected to the host device 1300 by a network 1302 (a small-area network such as a LAN or a large-area network such as the Internet). In this case, the above described stored program (stored information) is stored in an information storage medium 1306 such as a magnetic disk device, magnetic tape device, or memory that can be controlled by the host device 1300. If game images and sounds can be generated by each of the terminals 1304-1 to 1304-n in a stand-alone manner, means such as a game program for generating game images and sounds is transferred to the terminals 1304-1 to 1304-n from the host device 1300. If game images and sounds cannot be generated in a stand-alone manner by the terminals 1304-1 to 1304-n, on the other hand, the host device 1300 creates them then transfers them to those terminals for output thereby.

Note that the processing of this invention in the configuration shown in FIG. 21C could also be divided between the host device (server) and the terminals. Similarly, the above described stored program (stored information) used for implementing the present invention could be divided between an information storage medium on the host device (server) and information storage media of the terminals.

In addition, the terminals connected by the network could be either those of domestic game systems or those of arcade game systems. If arcade game systems are connected by a network, it is preferable to use portable information storage devices (memory cards or hand-held game machines) that can exchange information with arcade game systems and also exchange information with domestic game systems.

Note that this invention is not limited to the above described embodiments and thus it can be implemented in various other ways.

For example, the present invention can equally well be applied to motion blends using parameters that are mathematically equivalent to the individual blend ratios and general blend ratios described with reference to this embodiment.

In addition, the motion blends of the present invention could use both of the individual blend ratios and general blend ratios, or they could use only one of the individual blend ratios and general blend ratios.

The methods of setting the individual blend ratios and general blend ratios are not limited to those described with reference to this embodiment, and thus various modifications thereof are possible. Various modifications are also possible to the processing of motion scripts.

This embodiment was described with reference to two motion control sections operating in parallel, but there could equally well be three or more motion control sections operating in parallel.

For example, it is possible for an aspect of the present invention that is defined by a dependent claim to omit some of the configurational requirements of the corresponding antecedent claim. Similarly, the components of the present invention defined by an independent claim can also be allocated to other independent claims.

The present invention can be applied to various games (such as hand-to-hand combat games, shooting games, robot-battling games, sports games, competitive games, role-playing games, instrument-playing games, and dance games).

This invention is also not limited to arcade and domestic game systems; it can be applied to various other game image generation systems (game systems) such as large-scale attractions in which many players can participate, simulators, multimedia terminals, and system boards that create game images.

What is claimed is:

1. An image generation method for generating an image, comprising:

blending motion data that specifies a shape of a skeleton of a model object, based on individual blend ratios of which values are set individually for each bone that configures the skeleton of the model object, the values of the individual blend ratios for one bone being capable of being different from the values for an adjacent bone;

performing motion processing of the model object, based on the motion data obtained by the blending; and generating an image from a given viewpoint within an object space in which a plurality of objects including the model object are disposed.

2. The image generation method as defined in claim 1, wherein:

when the skeleton of the model object includes a Kth bone positioned at an end portion of the skeleton, a (K+1)th bone adjacent to the Kth bone, a (K+2)th bone adjacent to the (K+1)th bone, . . . and an Lth bone; individual blend ratios for first motion data are set to gradually increase and individual blend ratios for second motion data are set to gradually decrease, from the Kth bone towards the Lth bone.

3. The image generation method as defined in claim 1, wherein the motion data is blended on the basis of a general blend ratio of which value is set uniformly for bones of the skeleton of the model object, and the individual blend ratios of which values are set individually for each bone.

4. The image generation method as defined in claim 3, wherein the general blend ratio is changed with the elapse of time.

5. The image generation method as defined in claim 1, further comprising:

selecting the motion data for the model object and controlling motion of the model object by a plurality of motion control sections, based on motion scripts in which are defined the motion data to be selected and motion script switching conditions; and blending the motion data selected by the motion control sections.

6. An image generation method for generating an image, comprising:

selecting motion data for a model object and controlling motion of the model object by a plurality of motion control sections, based on motion scripts in which are defined the motion data to be selected and motion script switching conditions;

blending the motion data selected by the motion control sections;

performing motion processing of the model object, based on the motion data obtained by the blending; and generating an image from a given viewpoint within an object space in which a plurality of objects including the model object are disposed, wherein a first group of the motion scripts are allocated to a main-side motion control section of the plurality of motion control sections; and a second group of the motion scripts are allocated to a sub-side motion control section of the motion control sections.

7. The image generation method as defined in claim 6, further comprising:

determining whether the motion script switching condition is satisfied or not, based on input data from a manipulation section and status information for the model object.

8. The image generation method as defined in claim 6, wherein:

the motion script switching conditions for switching to the motion scripts of the second group are defined in the motion scripts of the first group; and the main-side motion control section continues to perform motion control based on the motion scripts of the first group, even when the motion script switching conditions for switching to the motion scripts of the second group are satisfied and the sub-side motion control section has started motion control based on the motion scripts at the switching destination.

9. The image generation method as defined in claim 6, wherein:

a group of transitional motion scripts among the motion scripts having a switching condition which requires a transition instruction from a manipulation section for switching are allocated to a first motion control section of the plurality of motion control sections;

a group of attack motion scripts among the motion scripts having a switching condition which requires an attack instruction from the manipulation section for switching are allocated to a second motion control section of the motion control sections;

the first motion control section selects transitional motion data corresponding to the transitional motion scripts;

the second motion control section selects attack motion data corresponding to the attack motion scripts; and the transitional motion data selected by the first motion control section is blended with the attack motion data selected by the second motion control section.

10. A computer-usable program embodied on an information storage medium, the program causing a computer to function as:

a motion blend section which blends motion data that specifies a shape of a skeleton of a model object, based on individual blend ratios of which values are set individually for each bone that configures the skeleton of the model object, the values of the individual blend ratios for one bone being capable of being different from the values for an adjacent bone, and performs motion processing of the model object, based on the motion data obtained by the blending; and an image generation section which generates an image from a given viewpoint within an object space in which a plurality of objects including the model object are disposed.

11. The program as defined in claim 10, wherein:

when the skeleton of the model object includes a Kth bone positioned at an end portion of the skeleton, a (K+1)th bone adjacent to the Kth bone, a (K+2)th bone adjacent to the (K+1)th bone, . . . and an Lth bone; individual blend ratios for first motion data in the motion data are set to gradually increase and individual blend ratios for second motion data in the motion data are set to gradually decrease, from the Kth bone towards the Lth bone.

12. The program as defined in claim 10, wherein the motion blend section blends motion data on the basis of a general blend ratio of which value is set uniformly for bones of the skeleton of the model object, and the individual blend ratios of which values are set individually for each bone.

13. The program as defined in claim 12, wherein the general blend ratio is changed with the elapse of time.

14. The program as defined in claim 10, further causing a computer to function as:

a plurality of motion control sections which select the motion data for the model object and control motion of the model object, based on motion scripts in which are defined the motion data to be selected and motion script switching conditions, wherein the motion blend section blends the motion data selected by the motion control sections.

15. A computer-usable program embodied on an information storage medium, the program causing a computer to function as:

a plurality of motion control sections which select motion data for a model object and control motion of the model object, based on motion scripts in which are defined the motion data to be selected and motion script switching conditions;

a motion blend section which blends the motion data selected by the motion control sections, and performs motion processing of the model object, based on the motion data obtained by the blending; and an image generation section which generates an image from a given viewpoint within an object space in which a plurality of objects including the model object are disposed, wherein a first group of the motion scripts are allocated to a main-side motion control section of the plurality of motion control sections; and a second group of the motion scripts are allocated to a sub-side motion control section of the motion control sections.

16. The program as defined in claim 15, wherein:

whether the motion script switching condition is satisfied or not is determined, based on input data from a manipulation section and status information for the model object.

17. The program as defined in claim 15, wherein:

the motion script switching conditions for switching to the motion scripts of the second group are defined in the motion scripts of the first group; and the main-side motion control section continues to perform motion control based on the motion scripts of the first group, even when the motion script switching conditions for switching to the motion scripts of the second group are satisfied and the sub-side motion control section has started motion control based on the motion scripts at the switching destination.

18. The program as defined in claim 15, wherein:

a group of transitional motion scripts among the motion scripts having a switching condition which requires a transition instruction from a manipulation section for switching are allocated to a first motion control section of the plurality of motion control sections;

a group of attack motion scripts among the motion scripts having a switching condition which requires an attack instruction from the manipulation section for switching are allocated to a second motion control section of the motion control sections;

the first motion control section selects transitional motion data corresponding to the transitional motion scripts;

the second motion control section selects attack motion data corresponding to the attack motion scripts; and the transitional motion data selected by the first motion control section is blended with the attack motion data selected by the second motion control section.

19. A computer-readable information storage medium storing the program as defined in claim 10.

20. A computer-readable information storage medium storing the program as defined in claim 15.

21. The image generation method as defined in claim 5, further comprising:

determining whether the motion script switching condition is satisfied or not, based on input data from a manipulation section and status information for the model object.

22. The image generation method as defined in claim 5, wherein:

a first group of the motion scripts are allocated to a first motion control section of the plurality of motion control sections; and a second group of the motion scripts are allocated to a second motion control section of the motion control sections.

23. The image generation method as defined in claim 22, wherein:

the motion script switching conditions for switching to the motion scripts of the second group are defined in the motion scripts of the first group; and the first motion control section continues to perform motion control based on the motion scripts of the first group, even when the motion script switching conditions for switching to the motion scripts of the second group are satisfied and the second motion control section has started motion control based on the motion scripts at the switching destination.

24. The image generation method as defined in claim 5, wherein:

a group of transitional motion scripts among the motion scripts having a switching condition which requires a transition instruction from a manipulation section for switching are allocated to a first motion control section of the plurality of motion control sections;

a group of attack motion scripts among the motion scripts having a switching condition which requires an attack instruction from the manipulation section for switching are allocated to a second motion control section of the motion control sections;

the first motion control section selects transitional motion data corresponding to the transitional motion scripts;

the second motion control section selects attack motion data corresponding to the attack motion scripts; and the transitional motion data selected by the first motion control section is blended with the attack motion data selected by the second motion control section.

25. The program as defined in claim 14, wherein:

whether the motion script switching condition is satisfied or not is determined, based on input data from a manipulation section and status information for the model object.

26. The program as defined in claim 14, wherein:

a first group of the motion scripts are allocated to a first motion control section of the plurality of motion control sections; and a second group of the motion scripts are allocated to a second motion control section of the motion control sections.

27. The program as defined in claim 26, wherein:

the motion script switching conditions for switching to the motion scripts of the second group are defined in the motion scripts of the first group; and the first motion control section continues to perform motion control based on the motion scripts of the first group, even when the motion script switching conditions for switching to the motion scripts of the second group are satisfied and the second motion control section has started motion control based on the motion scripts at the switching destination.

28. The program as defined in claim 14, wherein:

a group of transitional motion scripts among the motion scripts having a switching condition which requires a transition instruction from a manipulation section for switching are allocated to a first motion control section of the plurality of motion control sections;

a group of attack motion scripts among the motion scripts having a switching condition which requires an attack instruction from the manipulation section for switching are allocated to a second motion control section of the motion control sections;

the first motion control section selects transitional motion data corresponding to the transitional motion scripts;

the second motion control section selects attack motion data corresponding to the attack motion scripts; and the transitional motion data selected by the first motion control section is blended with the attack motion data selected by the second motion control section.

* * * * *